United States Patent
Stein, Sr. et al.

(10) Patent No.: US 6,208,233 B1
(45) Date of Patent: Mar. 27, 2001

(54) TRIM RESISTOR CONNECTOR AND SENSOR SYSTEM

(75) Inventors: William L. Stein, Sr.; Rick Loutzenhiser, both of Warren; Mark D. McCall, Youngstown, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/518,740

(22) Filed: Mar. 3, 2000

(51) Int. Cl.$^7$ .................................................. H01L 10/00
(52) U.S. Cl. ........................ 338/195; 338/232; 338/276; 338/234; 338/236; 338/226
(58) Field of Search ...................... 338/195, 226, 338/232, 234, 235, 236, 258, 276, 328

(56) References Cited

U.S. PATENT DOCUMENTS

| | | | |
|---|---|---|---|
| 2,859,318 | * 11/1958 | Ohlheiser | 338/234 |
| 2,892,250 | * 6/1959 | Bartels | 338/234 |
| 3,768,157 | * 10/1973 | Buie | 338/195 |
| 4,298,855 | * 11/1981 | Mills | 338/195 |
| 4,481,497 | 11/1984 | Kurtz et al. . | |
| 4,850,227 | 7/1989 | Leuttgen et al. . | |
| 5,209,122 | 5/1993 | Matly et al. . | |
| 5,798,685 | * 8/1998 | Katsuki et al. | 338/195 |

* cited by examiner

Primary Examiner—Karl D. Easthom
(74) Attorney, Agent, or Firm—Richard A. Jones

(57) ABSTRACT

An improved IDC trim resistor connector assembly made up of a generally open top cup shape connector with side wall slots and an interior first array of terminal posts arranged for passage therethrough of a first lead wire of sensor circuitry. A first stamped metal IDC terminal is push-on mounted on the terminal posts for IDC cradling and electrically and mechanically receiving and connecting to the first lead wire. A conventional trim resistor substrate is loose mounted but accurately positioned on the connector bottom wall and has an "E" pattern of resistive material adapted for center leg laser trimming to calibrate the associated sensor circuitry. A first IDC terminal spring leg overlap contacts one side leg of the trim resistor E-pattern and thereby spring clamps the resistor substrate. A cover is snap-latch mounted on the connector and has an access opening to enable laser trimming of the trim resistor after cover installation. One end of a second lead wire is received in a second IDC metal terminal in turn mounted on a second array of connector-interior terminal posts and also having a spring leg overlap electrically contacting and clamping the other E-pattern side leg. Spring barbs on the terminals anchor the same once fully inserted downwardly onto the terminal posts. Connector locking tangs and cover locking ears provide snap-on retention of the cover on the connector, and press-in/keeper internal cover projections cause push-down assembly of the lead wires as the cover is latched onto the connector. Cover locking tangs and cap latching ears provide snap-together locking of a cap on the cover when the cap is pushed down on the cover to seal the access opening after completion of laser trimming and in-filling of the covered container with sealant. In a second embodiment a crimp-type terminal, also provided with a spring clamping leg, is fastened to the second lead wire and has a barbed mounting strap clasping a modified second terminal post array when fully installed thereon.

26 Claims, 17 Drawing Sheets

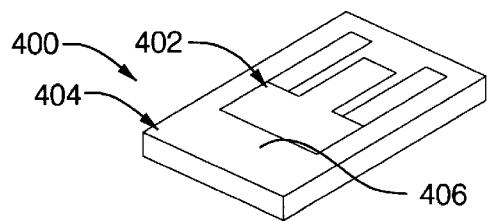
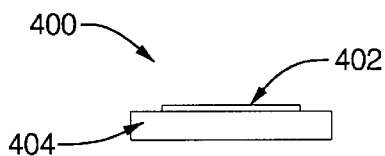
FIG. 47     FIG. 51
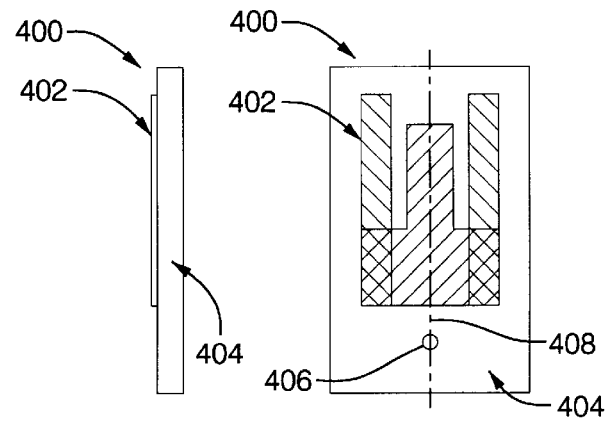
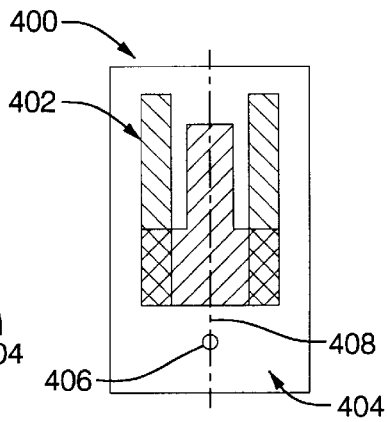
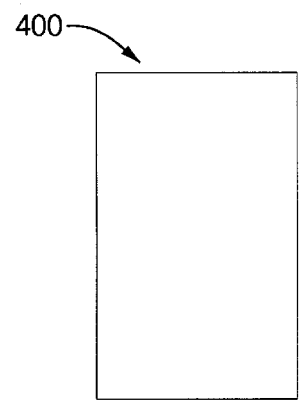
FIG. 48    FIG. 49    FIG. 50
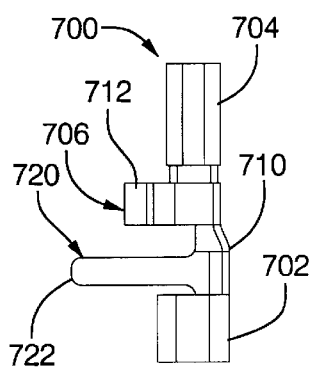
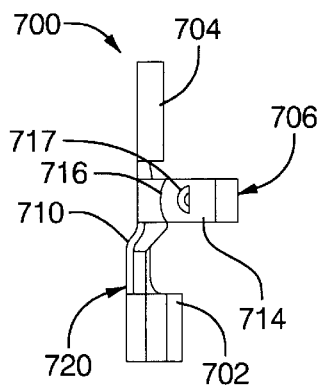
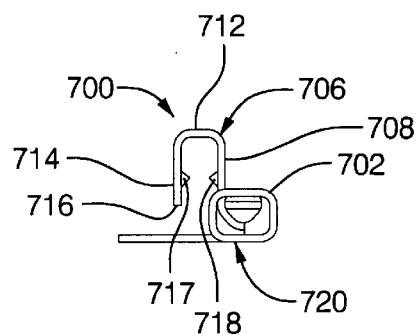
FIG. 53    FIG. 54    FIG. 55
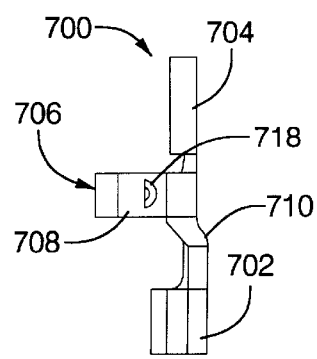
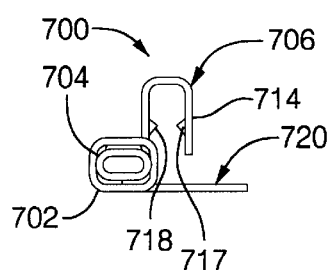
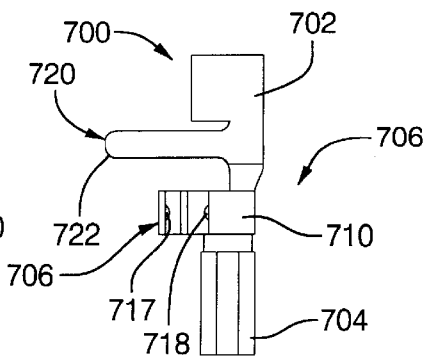
FIG. 56    FIG. 57    FIG. 58

TRIM RESISTOR CONNECTOR AND SENSOR SYSTEM

TECHNICAL FIELD

The present invention relates to calibration of automotive sensor circuitry, and more particularly to a trim resistor connector assembly for mechanical and electrical coupling into the output circuitry of a sensor element provided in an automotive electronic control system.

BACKGROUND OF THE INVENTION

With the steady growth in recent years of vehicle electronic systems, the number of sensors used in automobiles has also risen dramatically. Current vehicles can contain forty to fifty of such sensors. Among the types of sensors commonly provided are pressure sensors in the vehicle fuel systems, air bag sensors, over-current and over temperature-protection sensors, oxygen sensors for exhaust gas systems, catalyst temperature sensor, etc. With most if not all of such sensors, signal conditioning will be necessary for most sensor elements. Raw sensors exhibit some level of offset voltage in output signal level when no stimulus is applied to the sensor. Typically, a potentiometer or a trim resistor branch circuit that is laser trimmed for calibration is employed to calibrate the output signal from the sensor.

For example, in the case of exhaust sensors the trim resistor is used in the automotive oxygen sensor output to ECU circuitry connection system. Hitherto, this trim resistor has been provided as an integral part of the sensor wiring output connector assembly. In one commercially provided connector assembly six male blade terminals are provided and four of the terminals are crimped to wires coming from the sensor. The remaining two terminals are insert molded into the connector assembly and one end of each terminal is soldered to a contact pad on the trim resistor substrate. An opening is provided on the side of the connector assembly to install the trim resister and allow access for the laser trimming operation. The opening is then closed and sealed with a cover and gasket.

In this prior art construction currently in use the ceramic substrate and terminals are pre-molded parts that are inserted as a pre-molded part into the connector assembly mold and then secured therein as a mold-over part. Hence the connector assembly construction must be designed to match the connector assembly family currently used in the given wiring system of the vehicle design. This current practice is thus limited in flexibility and adaptability when it is desired to provide resistance trim capability as an add-on to exhaust system sensors in automotive vehicle electronic systems. Mold tooling costs are also a problem when system design changes are mandated.

There is thus a need to provide a trim resistor connector assembly construction that can be economically manufactured, assembled and installed to be operably coupled as an add-on to new as well as existing sensor wiring assemblies. In addition, there is the continuing need to improve exhaust sensor performance by enhancing calibration circuit construction. There is also the ongoing need to reduce the expense of the calibrating means for the sensor, and one that can be employed to calibrate the sensor prior to installing in the vehicle.

OBJECTS OF THE INVENTION

Accordingly, among the objects of the present invention are to provide an improved trim resistor connector assembly and improved system coupling of the same that provides a solution to the aforementioned problems and overcomes the aforementioned disadvantages of existing trim resistor constructions employed in conjunction with various automotive sensors in vehicle electronic systems.

SUMMARY OF THE INVENTION

In general, and by way of summary description and not by way of limitation, the present invention fulfills one or more of the foregoing objects by providing an improved IDC trim resistor connector assembly characterized by a connector of generally open top cup shape having a bottom wall and a peripheral side wall with side wall slots and with an interior first array of terminal posts arranged to accommodate passage therethrough of a first lead wire of sensor circuitry. A first stamped metal IDC terminal is push-on mounted to the terminal posts and adapted to IDC cradle and connect to the first lead wire. A trim resistor substrate is mounted on the bottom wall of the connector and has an "E" pattern of resistive material thereon adapted for laser trimming for calibration of circuitry to be associated with the trim resistor connector assembly. The first IDC terminal has a spring arm overlapping one side leg of the Dim resistor E-pattern and spring clamping the resistor substrate in place on the connector bottom wall. A cover is snap-latch mounted on the connector and has an access opening in registry with the trim resistor substrate to enable laser trimming and resultant circuit calibration by access through the cover opening. A second IDC metal terminal is similarly mounted in the connector on a second array of terminal posts for electrically connecting a second lead wire via its spring leg to the other side leg of the E-pattern to provide a conductive laser-trimmable resistance path between the first and second lead wires in assembly and operation of the connector assembly in an electrical system. The IDC terminals have spring barbs cooperative with the terminal posts to anchor the same once fully inserted downwardly onto the terminal posts. The associated terminal spring aims mechanically clamp the trim substrate in position on the connector bottom wall to at least initially hold the same in place for subsequent processing, including the laser trimming operation.

Preferably the connector assembly includes a cap for covering the cover opening. The cover and connector have cooperative locking tangs and locking ears to provide snap-on retention of the cover on the connector during push-down assembly of the cover on the connector. The cap and cover likewise have cooperative locking tangs and latching ears adapted to provide snap-together locking of the cap on the cover when the cap is pushed down and assembled on the cover opening after laser trimming and in filling of the covered container with a sealant gel.

A second embodiment provides a crimped terminal that is, in place of the second IDC terminal, fastened to the second lead wire and has a mounting strap with mounting barbs to hold the crimped terminal in place along with the end of the second lead when fully installed on a modified second terminal post array.

BRIEF DESCRIPTION OF THE DRAWINGS

The foregoing as well as additional objects, features and advantages of the present invention will become apparent from the following detailed description of preferred but exemplary embodiments of the invention, from the appended claims and from the accompanying drawings (which are to engineering scale unless otherwise indicated), wherein:

FIG. 47 is a perspective view of the trim resistor and substrate subassembly employed in the connector assembly of FIGS. 1 through 9.

FIGS. 48 through 51 are respectively side elevational, top plan, bottom plan and end elevational views of the resistor substrate subassembly of FIG. 47.

FIG. 53 is a top plan view of a modified IDC terminal employed in the embodiment of FIG. 52.

FIGS. 54 through 57 are side and end elevational views of the IDC terminal shown in FIG. 53.

FIG. 58 is a bottom plan view of the IDC terminal of FIGS. 53–57.

DESCRIPTION OF PREFERRED EMBODIMENTS

Figure 9:
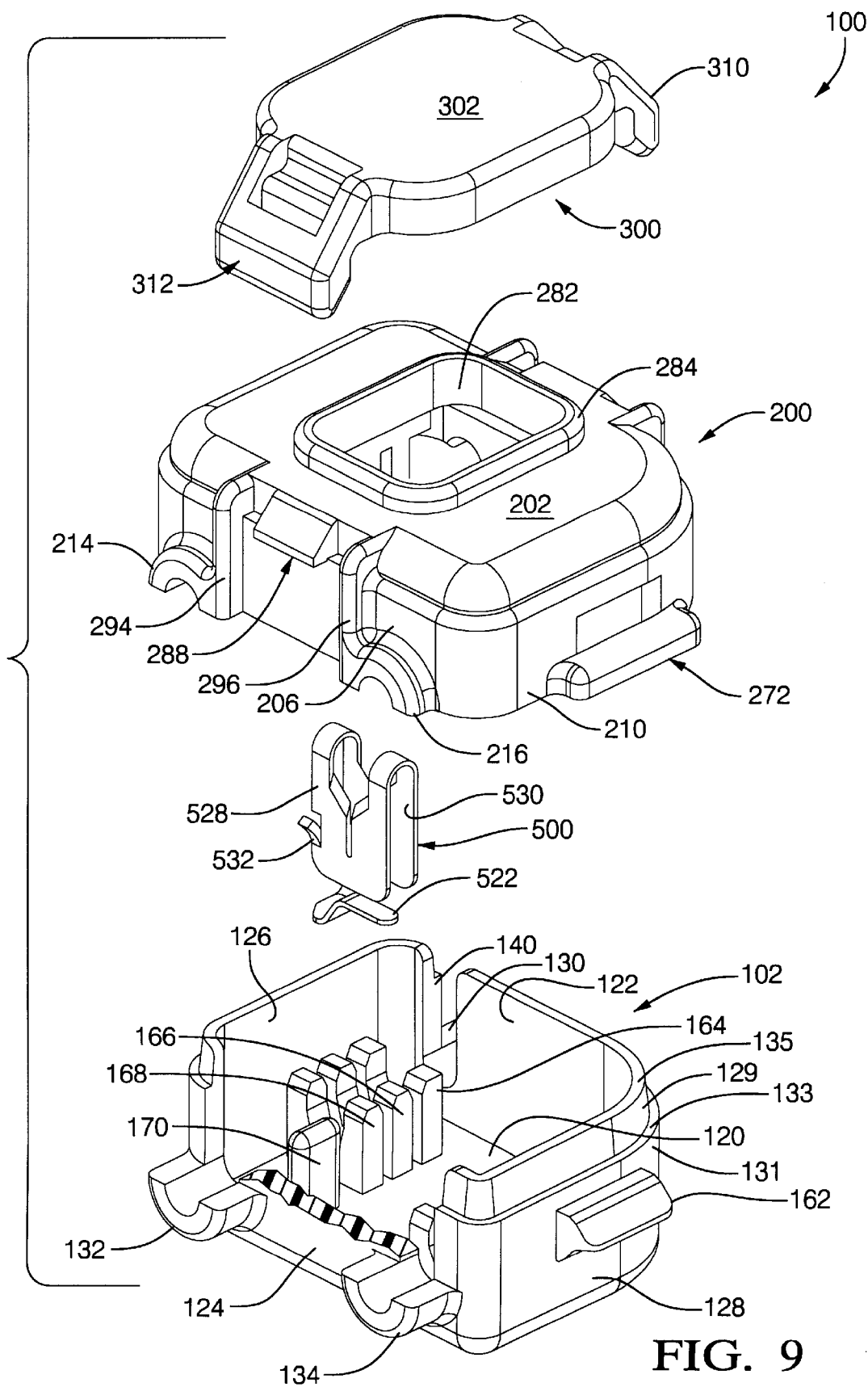
FIG. 9 is an exploded perspective view of the components of the connector assembly of FIGS. 1–8.

Referring in more detail to the accompanying drawings, the first embodiment of the connector assembly of the invention is shown assembled in FIGS. 1 through 8 and in exploded perspective in FIG. 9 and is made up of the following six principal components:

(1) A housing base herein termed the "connector" 102;

(2) A cover 200;

(3) A cap 300;

(4) A conventional trim resistor substrate 400;

(5) A first insulation displacement connector (IDC) terminal 500; and (6) A second IDC terminal 502.

The housing base part, i.e., connector 102, is shown by itself in FIGS. 12 through 21, these views being to engineering scale and incorporated herein by reference to facilitate making and using the first embodiment of the invention. Connector 102 is preferably an injection molded part made of suitable plastic material having good electrical insulation and heat and moisture resistance properties. It will also be seen from these views that connector 102 has generally an open top cup shape as defined by a bottom wall 120 basically of rectangular configuration in plan view (FIGS. 12 and 13), and a peripheral wall 122–128 extending upwardly from base wall 120 and made up of four integrally joined portions herein termed for convenience a front wall 122, a laterally opposite rear wall 124, a left-hand wall 126 and a right-hand wall 128.

Figure 12:
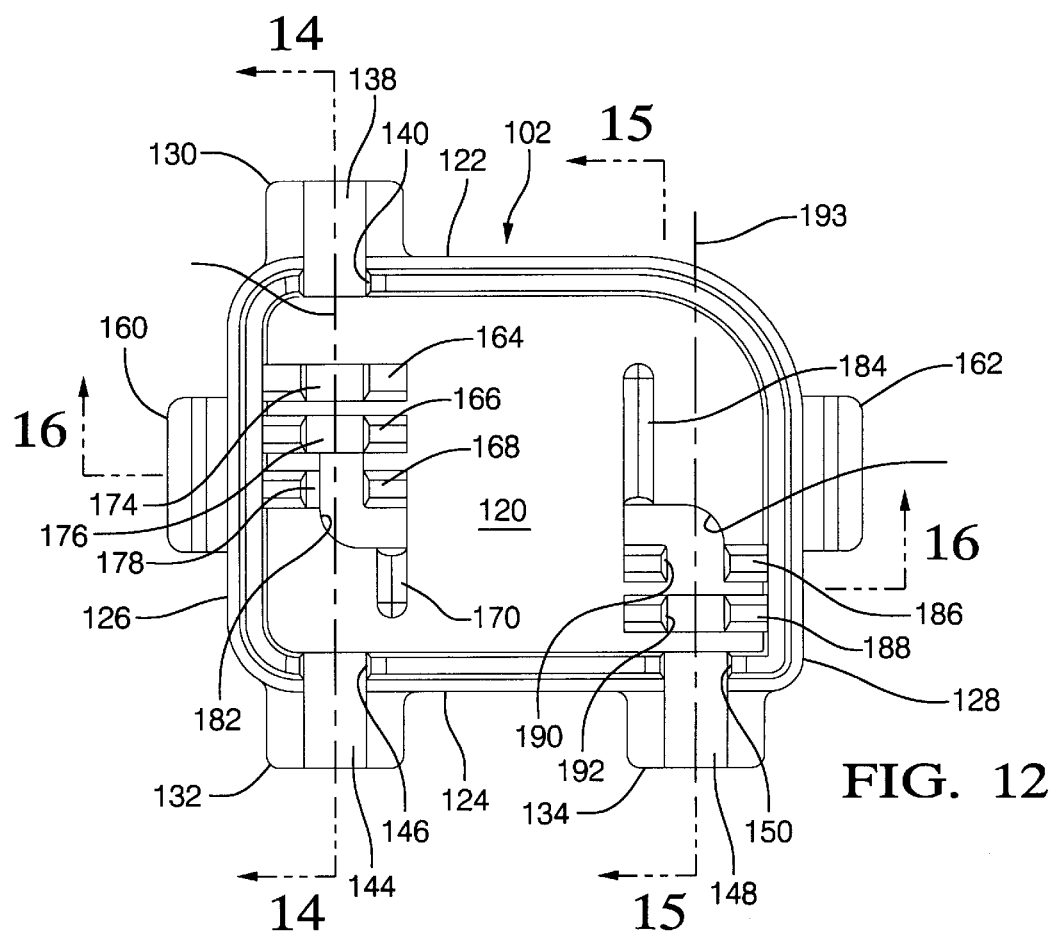
FIG. 12 is a top plan view of only the connector part of the assembly shown in FIGS. 1–9.
Figure 18:
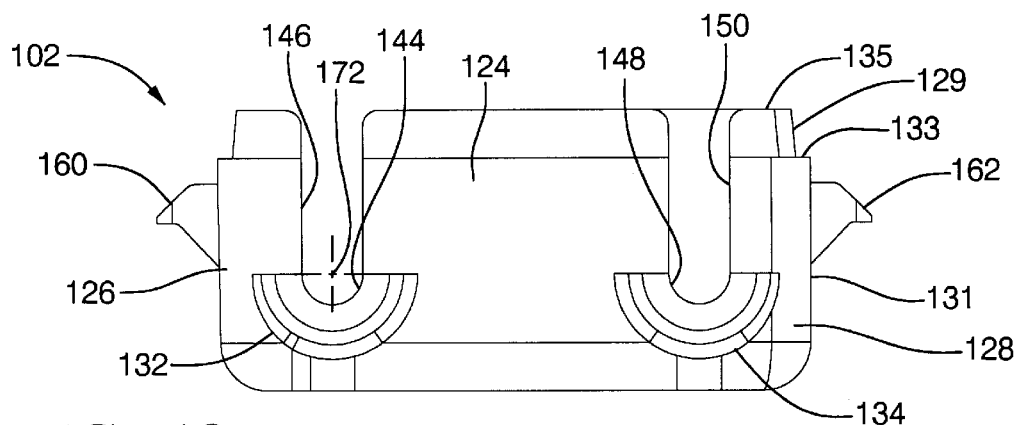
FIGS. 18–21 are side and end elevational views of the connector part shown in FIGS. 12 and 13.
Figure 19:
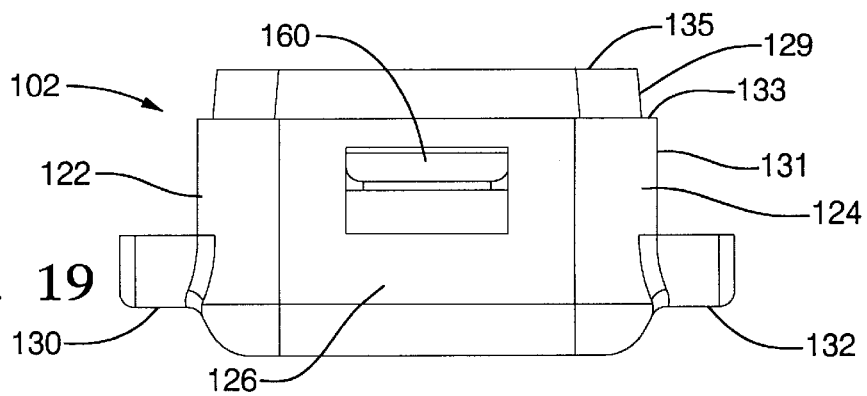
Figure 20:
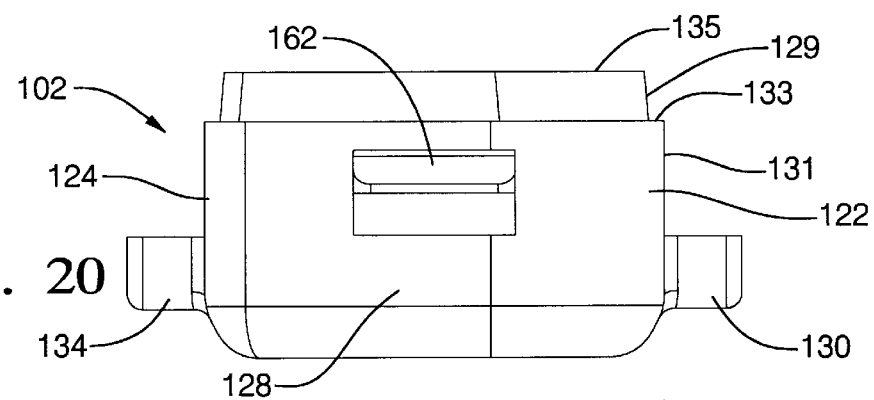
Figure 21:
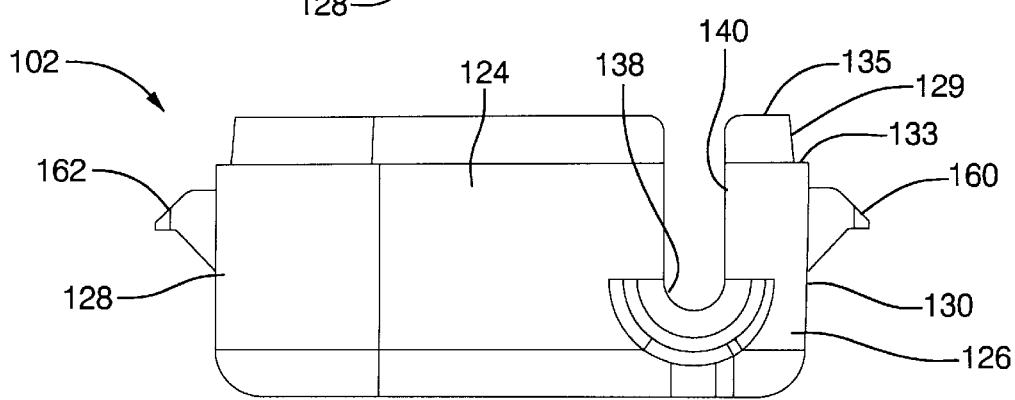
Figure 22:
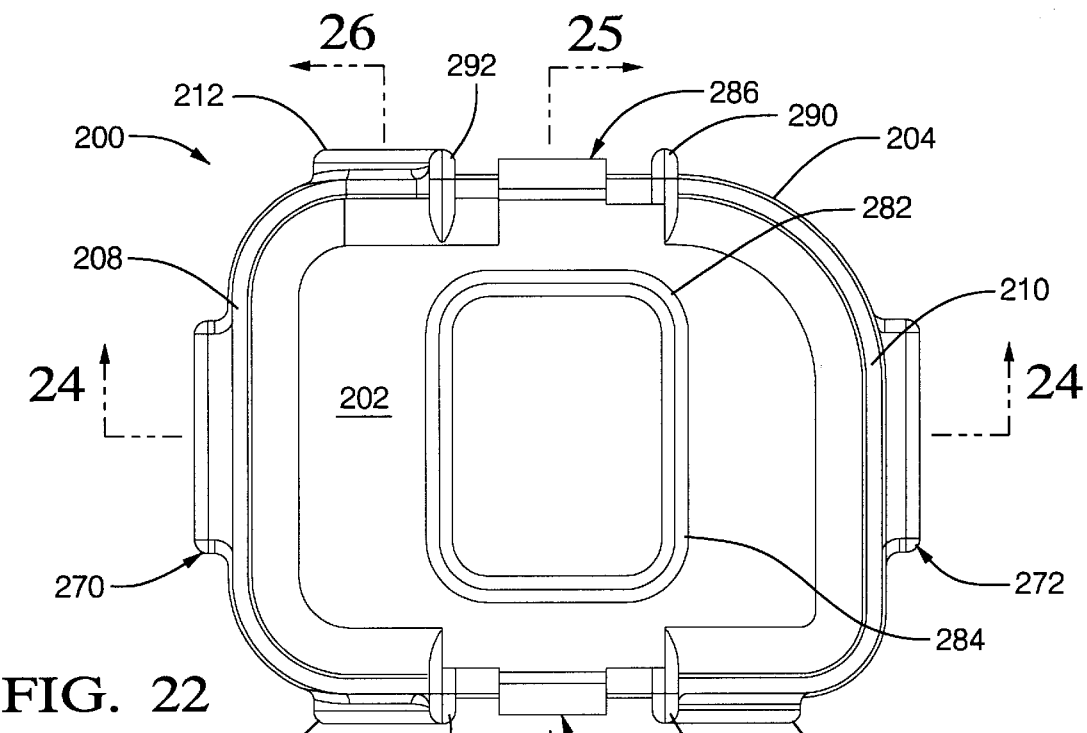
FIGS. 22 and 23 are top and bottom plan views respectively of only the cover part of the connector assembly of FIGS. 1–9.

Three lead wire half-ferrules 130, 132 and 134 protrude exteriorly in a coplanar array from the lower region of connector 102. Ferrule 130 protrudes from the left side of front wall 122 and, as best seen in FIGS. 9, 12 and 21, has its half groove 138 registering with the bottom end of a lead wire insertion slot 140 provided in wall 122. Ferrule 132 protrudes off the rear wall 124 and is coaxially aligned with ferrule 130. Ferrule 132 has its groove 144 coincident with the bottom of a lead wire receiving slot 146 provided in rear wall 124 (FIGS. 12 and 18). Ferrule 134 protrudes from the right-hand side of rear wall 124 and has its groove 148 coincident with the bottom of a lead wire insertion slot 150 provided in the right-hand side of back wall 124 (FIGS. 12 and 18).

The connector left and right side walls 126 and 128 are respectively provided with exteriorly protruding flexible and semi-resilient locking tangs 160 and 162 tapered to narrow in an outward direction and having upper and lower concave surfaces, as best seen in FIGS. 9, 12, 13 and 16 through 21.

Figure 10:
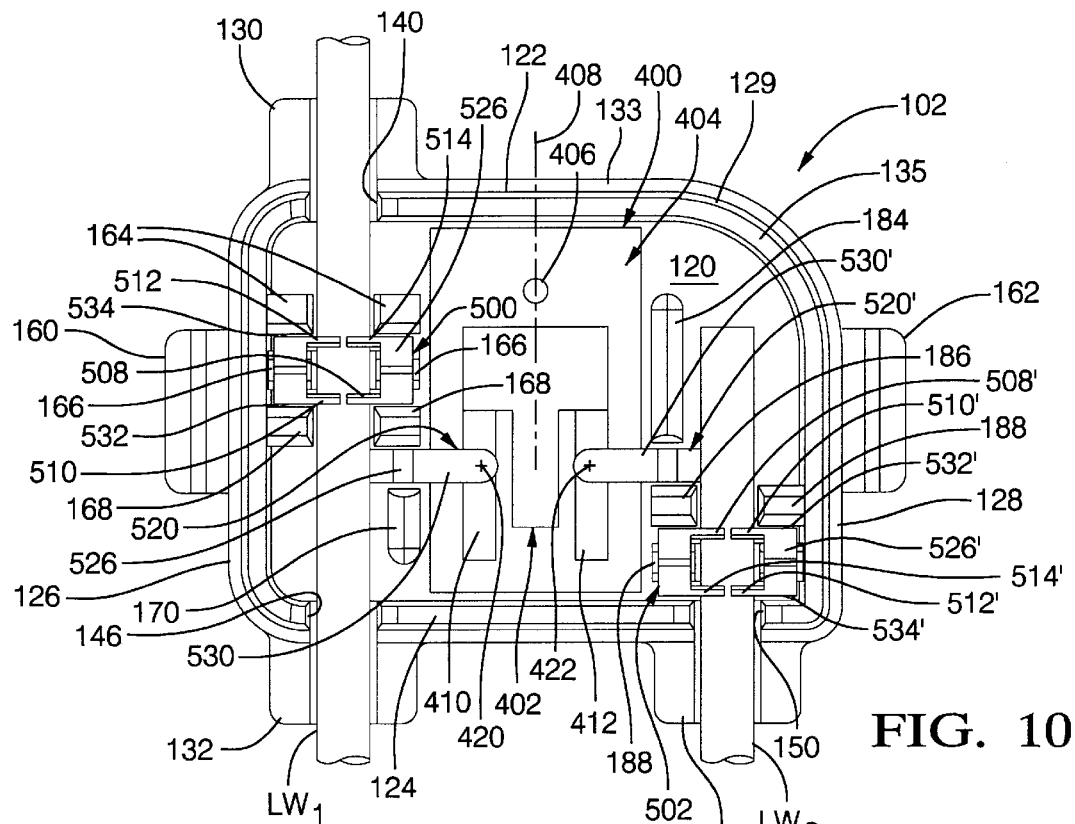
FIG. 10 is a top plan view of the connector part of the connector assembly of FIGS. 1–9 with the cover and cap removed and with electrical leads shown installed and coupled to associated insulation displacement connector (IDC) terminals provided in the connector part.
Figure 14:
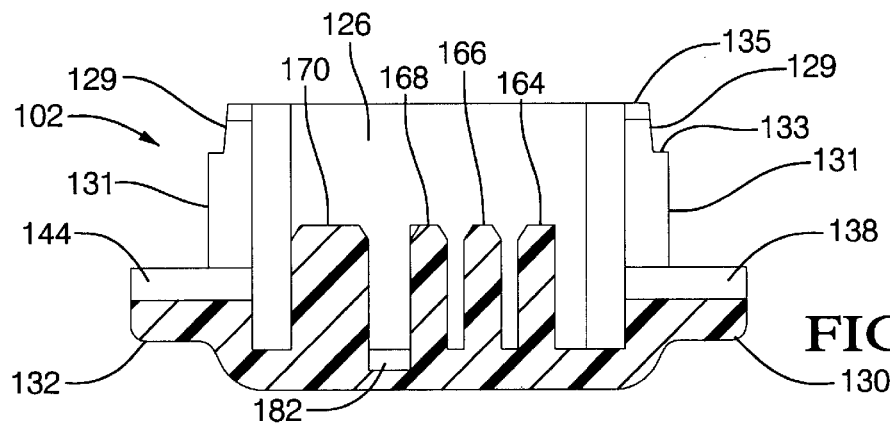
FIGS. 14 through 17 are sectional respectively views taken on the lines 14—14, 15—15 and 16—16 of FIG. 12 and on line 17—17 of FIG. 13.
Figure 15:
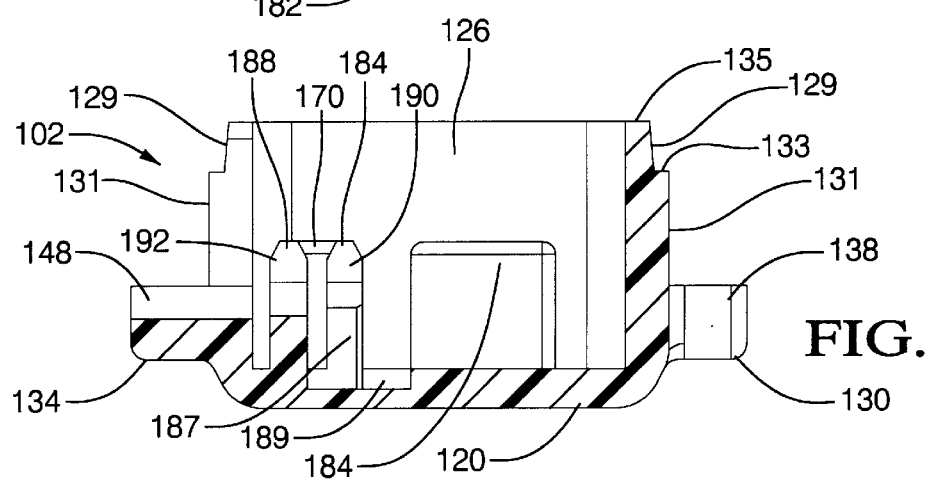

The configuration of the interior structure of connector 102 is best seen in FIGS. 9, 10, 12 and 14 through 17. A first array of terminal mounting posts 164, 166, 168 and 170 (FIGS. 9, 10, 12 and 14) protrude upwardly from the left-hand side of the upper, interior surface of bottom wall 120. Posts 164–170 are designed for cooperation with one another to provide a push-down insertion mounting of IDC terminal 500 in the manner shown in FIGS. 9 and 10. More particularly, posts 164,166 and 168 are arrayed parallel with one another and laterally spaced apart with their width dimension extending across and centered on the design axis 172,of the mounting pathway provided for receiving insulated lead wire $LW_1$ that is to be mechanically and electrically coupled within connector assembly 100 as shown in FIG. 10. For this purpose posts 164, 166 and 168 are respectively provided with axially aligned matching grooves 174, 176 and 178 each having semicircular bottom surfaces coincident with the axial projection of ferrule grooves 138 and 144 and in coaxial alignment therewith. Groove 178 in post 168 is extended downwardly by a slot 180 (FIG. 17) to accommodate spring leg structure of terminal 500 as described hereinafter. The bottom of slot 180 is flush with a trench 182 (FIGS. 12 and 16) leading out from post 168 toward rear wall 124 and then through a right angle turn so as to lead out into the space between posts 168 and 170. Preferably the top edges of each post 164–170 are chamfered (FIGS. 12 and 14).

Figure 13:
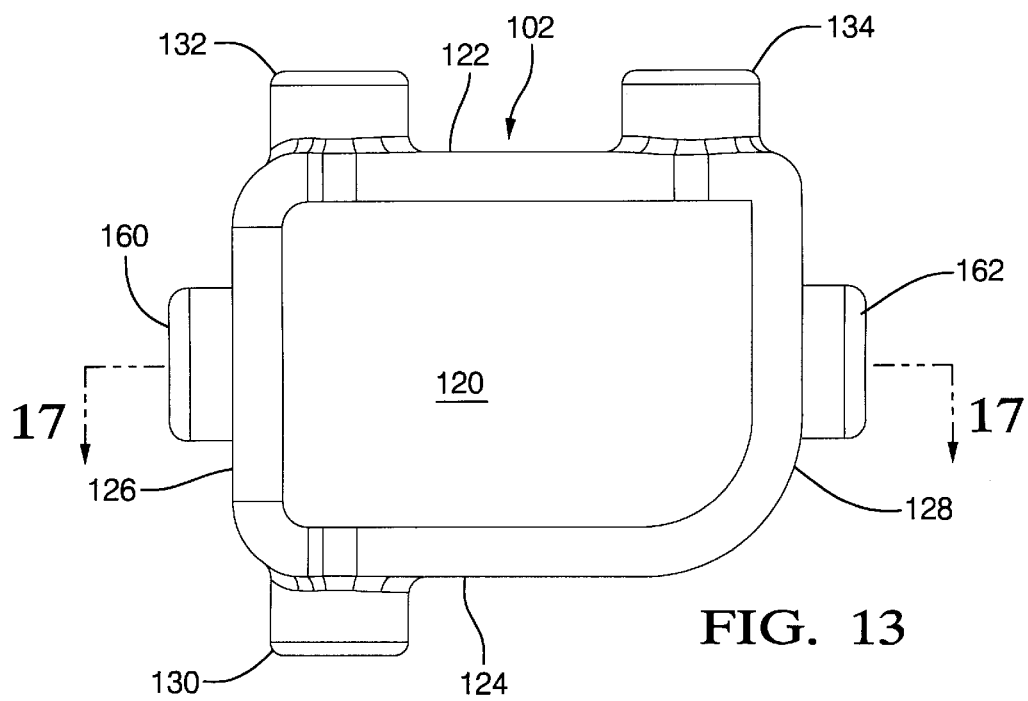
FIG. 13 is a bottom plan view of the connector part of FIG. 12.

As best seen in FIGS. 10, 12, 15 and 16, a second array of terminal mounting posts 184, 186 and 188 protrude upwardly from the right-hand side of the interior surface of bottom wall 120 of connector 102 and are designed to accommodate push-down insertion and mounting of IDC terminal 502 (FIG. 10). Posts 186 and 188 are oriented with their width dimensions parallel and are laterally spaced apart, with post 188 being adjacent but laterally spaced from rear wall 124. Posts 186 and 188 respectively have upwardly opening grooves 190 and 192 each having a bottom curvature coincident with groove 148 of half-ferrule 134. The center of curvature of grooves 190 and 192 is on the axis 193 of groove 148 of ferrule 134, which in turn is designed to be coincident with the axis of receiving pathway lead wire $LW_2$ that is to be mechanically and electrically coupled by terminal 502 into connector 102. Post 186 has a slot 187, similar to slot 180 of post 168, also leading to a recess or trench 189 having a 90° bend excursion and extending between posts 184 and 186 (FIGS. 12 and 13). It will be noted that post 184 is aligned with its major plane length and width dimensions perpendicular to those of posts 186 and 188 and parallel to axis 193, similar to the manner of post 170 being oriented relative to its cooperative posts 164–168.

Cover 200 is shown by itself in FIGS. 22 through 31 and comprises a base or top wall 202 with a dependent peripheral side wall perpendicular thereto and made up of a front wall portion 204, a rear wall portion 206, a left side wall portion 208 and a right side wall portion 210. It will be seen that cover 200 in plan view is larger but complementary in configuration to connector 102, cover peripheral wall 204–210 being dimensioned to exteriorly overlap connector peripheral wall 122–128 such that in assembly the connector 102 nests into cover 102, as best seen in FIGS. 1–8. Cover 200 also has a front half-ferrule 212 and a pair of rear half-ferrules 214 and 216 respectively having an associated semicircular groove 213, 215 and 217 corresponding to half-ferrule grooves 138, 144 and 148 so that in assembly of cover 200 on connector 102 a complete cylindrical lead-wire receiving passageway is formed in each ferrule in the closed condition of the connector assembly 100 to thereby limit entry and exit point flexing of lead wires $LW_1$ and $LW_2$ in use and operation.

Cover peripheral side walls 204–210 are of stepped exterior configuration in cross-section, as best seen in FIGS. 9 and 24–27 and are provided interiorly with a slight taper to match that of the exterior surface of tapering upper edge wall 129 of connector 102. Wall 129 is inset from the main exterior surface 131 of the connector peripheral wall 122–128, the junction of surfaces 129 and 131 being defined by the connector exterior peripheral ledge 133 (FIGS. 9, 12 and 14–21). The inclined exterior peripheral surface of wall 129 terminates at a planar upper edge surface 135 of connector 102 that runs peripherally around the upper edge of connector 102, as best seen in FIGS. 9 and 10. The interior surfaces of the cover peripheral walls 204–210 include (1) a peripherally running groove 220 having a root surface that seats on the peripheral upper edge 135 of connector 102 in assembly; (2) a peripheral tapered internal wall surface 222 that in assembly wedges and seats against inclined surface 129 of connector 102; (3) a shoulder 224 that in assembly seats on connector shoulder 133; and (4) a slightly larger diameter peripheral internal wall 226 that in assembly is spaced outwardly from and has a slight clearance with the main exterior peripheral wall surface 131 of cover 102 in assembly. An internal peripheral rib 230 of cover 200 has an outer periphery 232 dimensioned and oriented to ensure a wedge engagement of cover 200 on the upper inset edge of connector 102.

Figure 23:
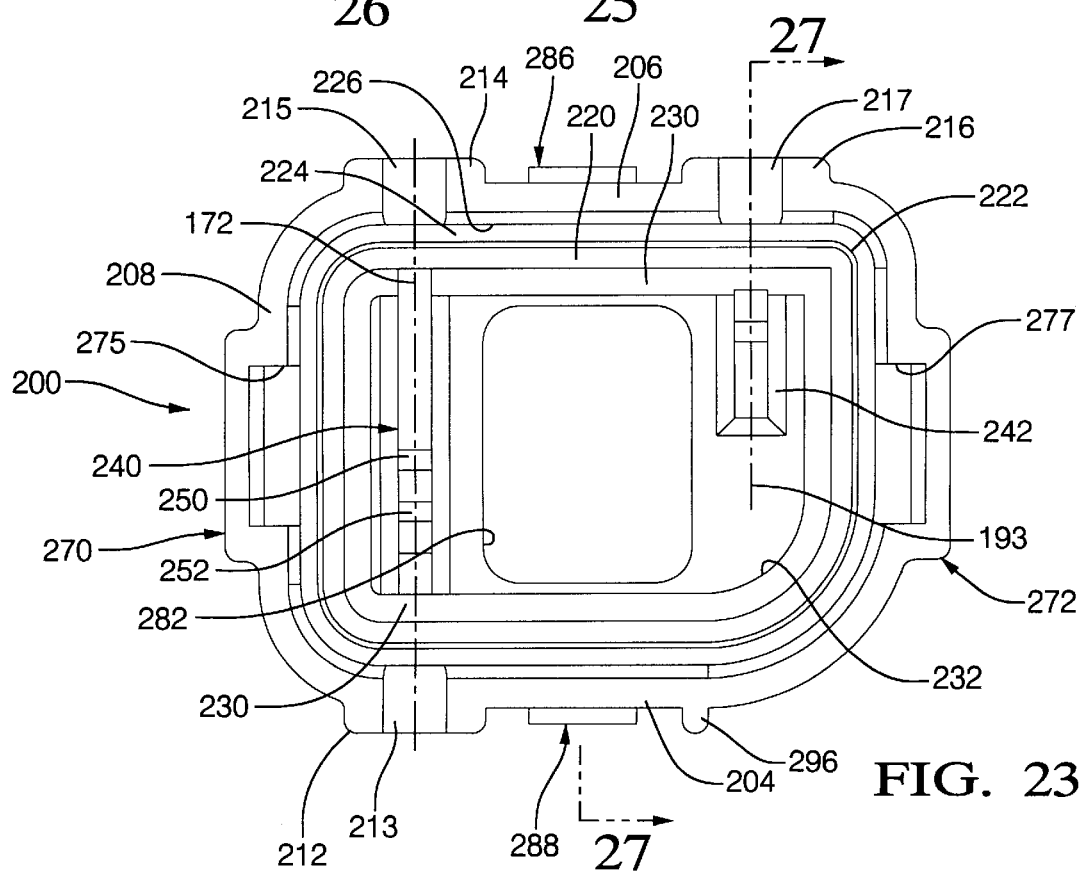
Figure 24:
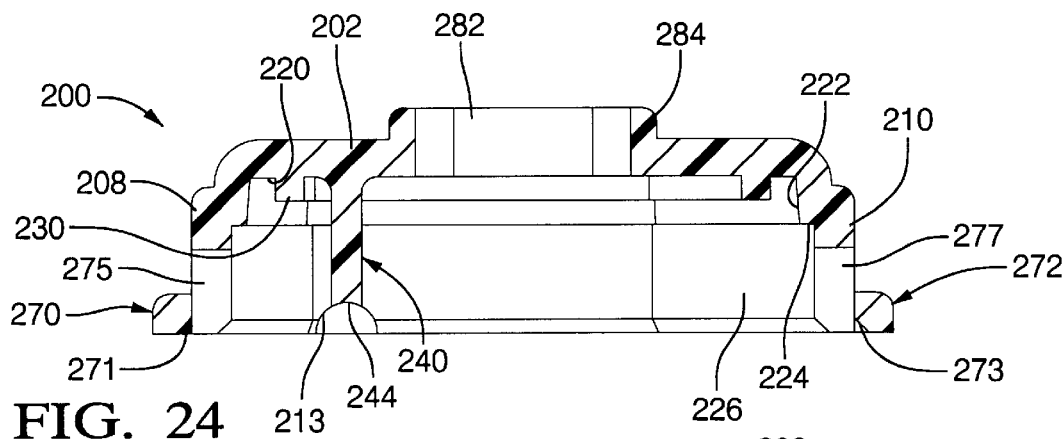
FIGS. 24 through 27 are sectional views taken respectively on the lines 24—24, 25—25 and 26—26 of FIG. 22 and on line 27—27 of FIG. 23 respectively.
Figure 25:
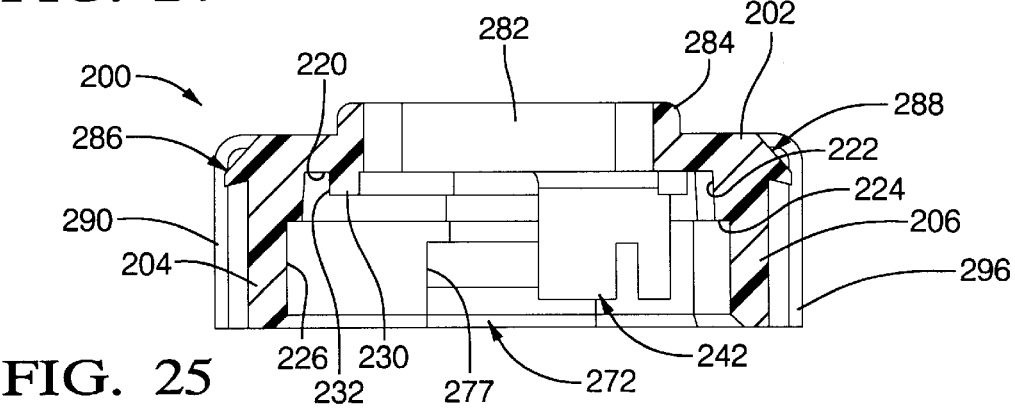
Figure 26:
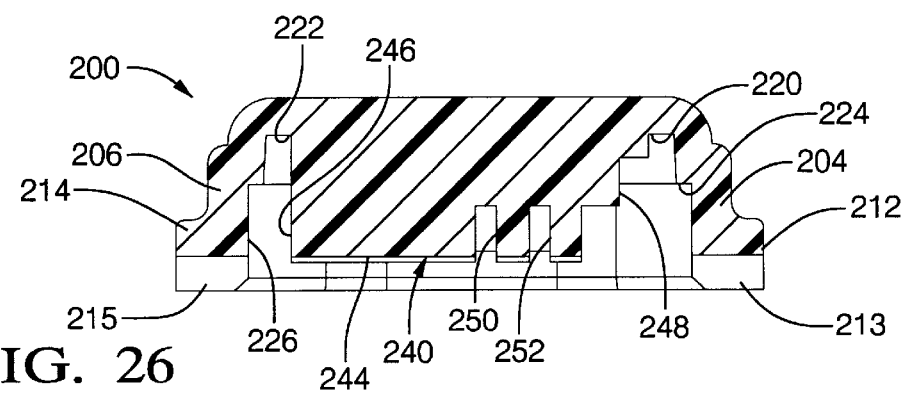
Figure 27:
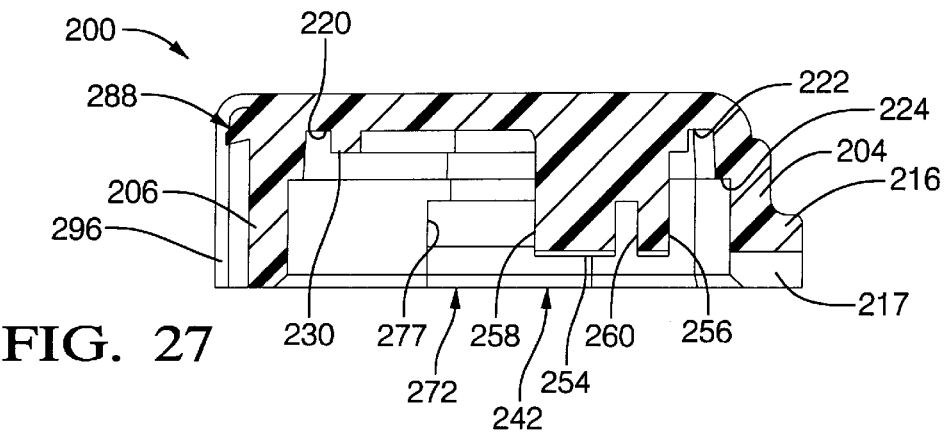
Figure 28:
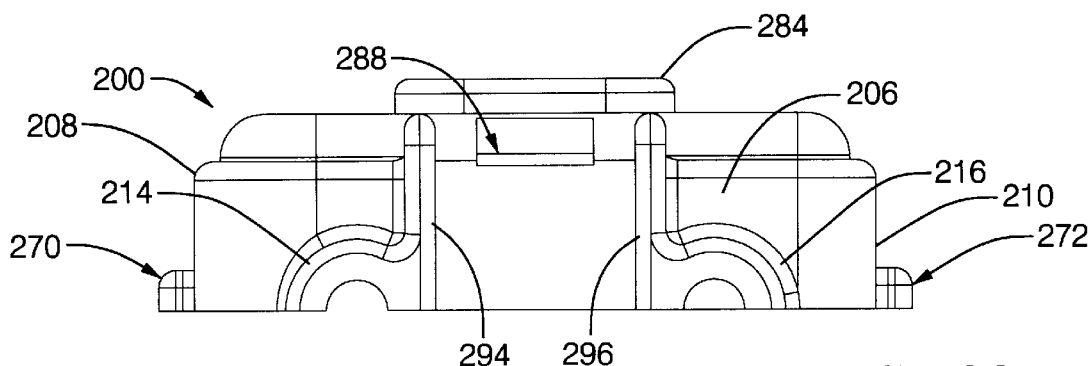
FIGS. 28 through 31 are end and side elevational views of the cover part of FIGS. 22 and 23.
Figure 29:
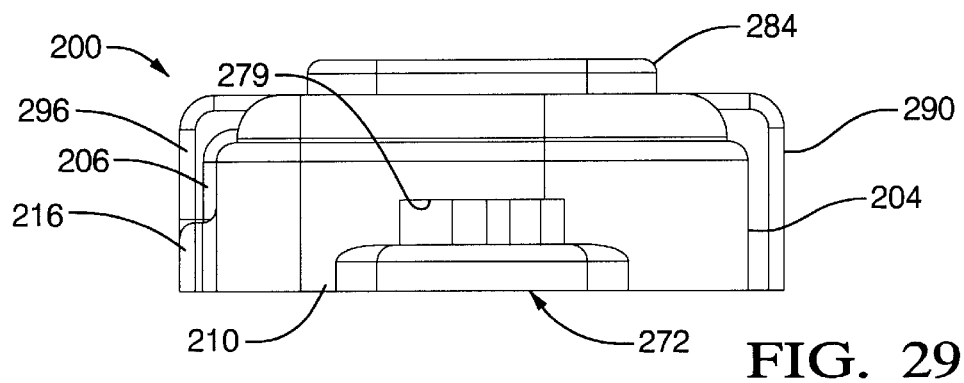
Figure 30:
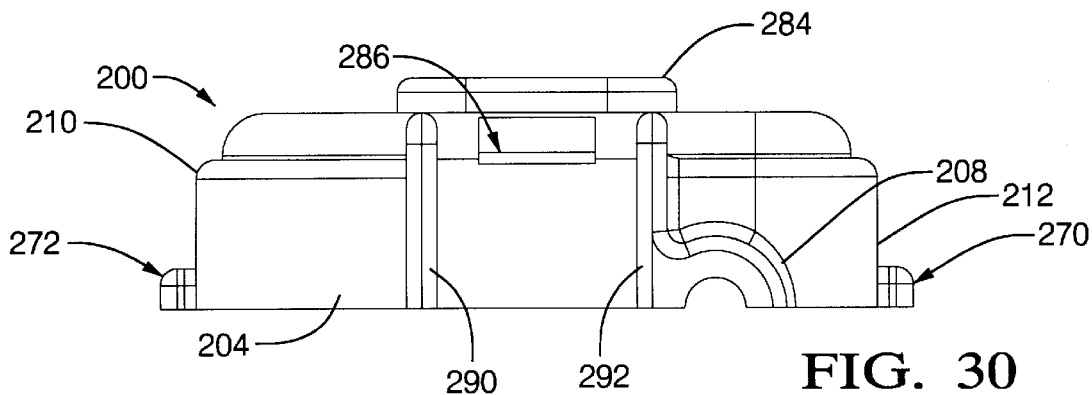

Cover 200 has two "push-in/keeper" internal projections 240 and 242 respectively oriented for alignment with the two parallel lead wire assembly paths individually provided in connector 102 for lead wires $LW_1$ and $LW_2$. As best seen in FIGS. 23 and 26, the first keeper 240 protrudes downwardly from top 202 of cover 200 to a lower edge 244 that is concave and coincident with an imaginary cylinder constituting an extension of the cylindrical surfaces of ferrule grooves 213 and 215 (FIG. 24). Keeper 240 extends lengthwise from a left-hand edge 246, that in assembly is oriented adjacent the interior surface of rear wall 124 of connector 102, to a right-hand edge 248 oriented to be spaced inwardly from front wall 122 of cover 102. Keeper 240 has a pair of spaced notches 250 and 252 that provide clearance in assembly for the protruding notched side walls of terminal 500.

The second keeper 242 is oriented to protrude downwardly to a lower edge 254 that is also concave and coincident with the imaginary extension of the cylindrical surface of ferrule groove 217. The right-hand edge 256 of keeper 242 in assembly is spaced closely adjacent the interior surface of rear wall 124 of connector 102. The left-hand edge 258 of keeper 242 in assembly is oriented to be opposite the approximate mid point of post 184. A notch 260 in keeper 242 is oriented for alignment in assembly with the innermost, otherwise interfering knife-edge structure of terminal 502 to provide clearance between keeper 242 of this structure. Left-hand edge 256 is spaced inwardly clear of the otherwise potentially interfering knife-edge structure of terminal 502 in assembly.

Figure 1:
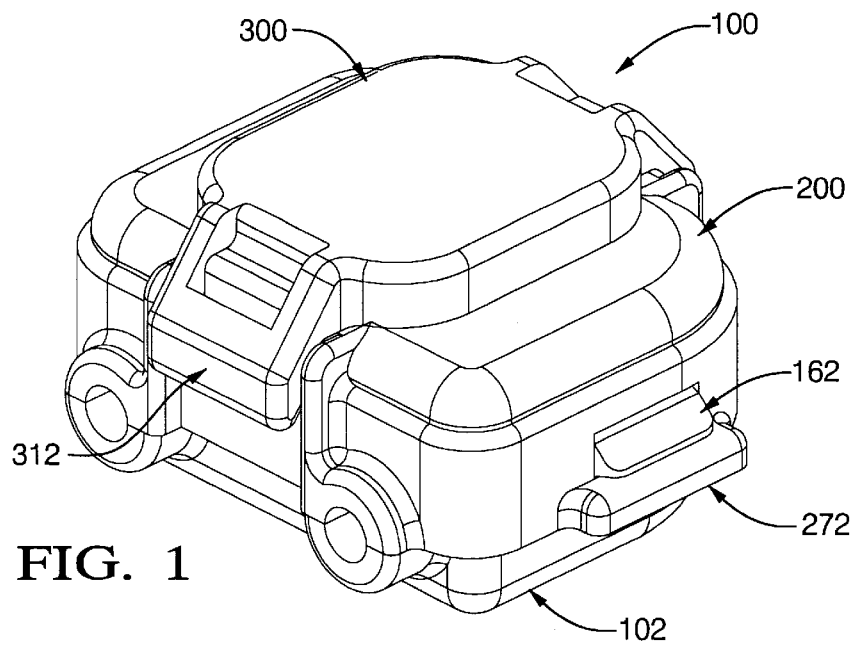
FIG. 1 is a perspective view of one embodiment of an improved trim resistor connector assembly of the present invention.
Figure 2:
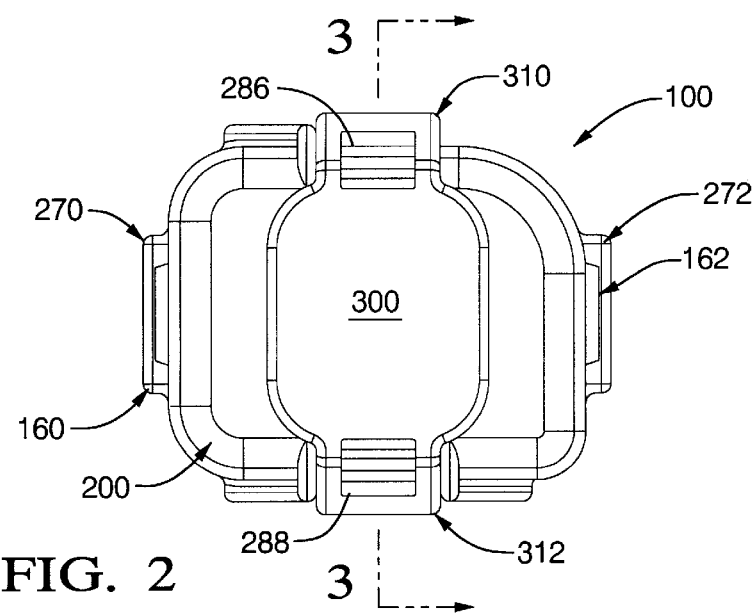
FIG. 2 is a top plan view of the connector assembly of FIG. 1.
Figure 11:
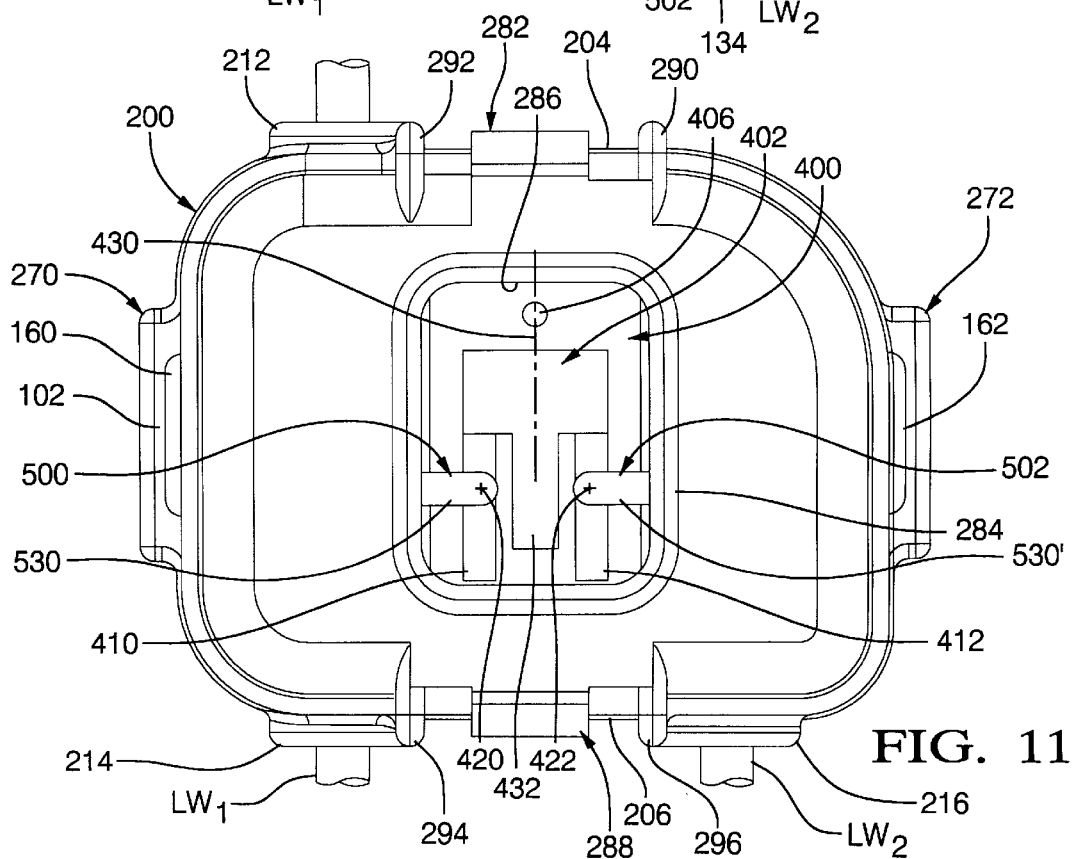
FIG. 11 is a top plan view similar to FIG. 10, but with the cover of the connector assembly installed on the connector part.
Figure 31:
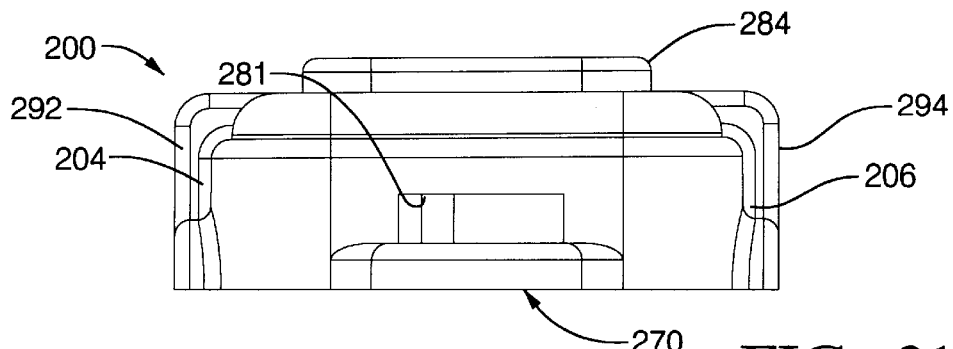
Figure 32:
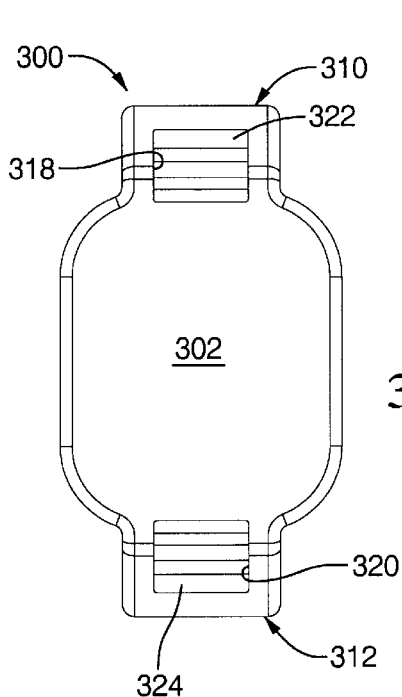
FIG. 32 is a top plan view of only the cap part of the connector assembly of FIGS. 1 through 9.
Figure 33:
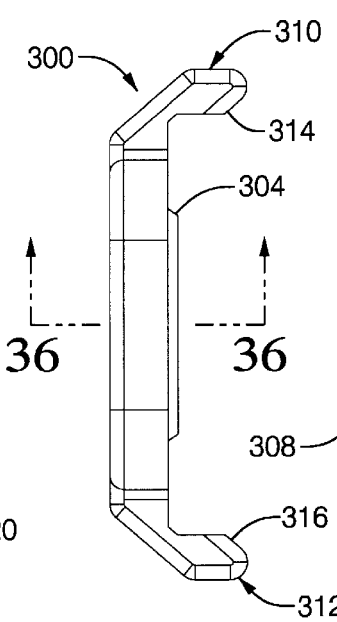
FIGS. 33 through 35 are respectively side elevational, bottom plan and end elevational views of the cap part of FIG. 32.
Figure 34:
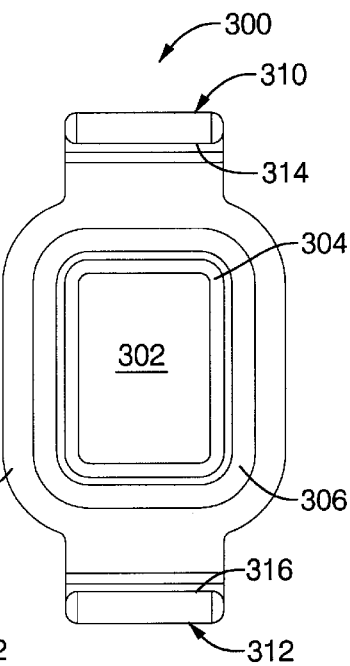
Figure 35:
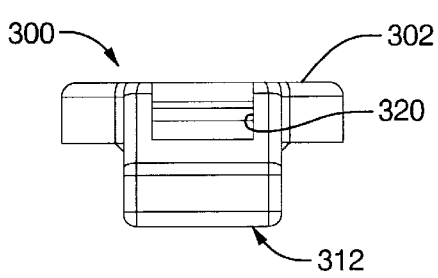
Figure 36:
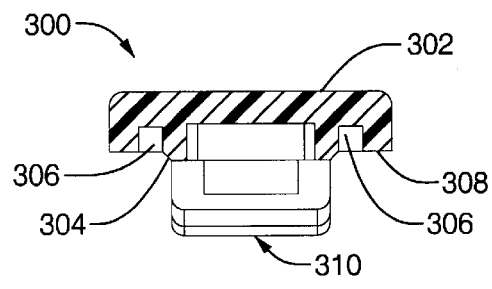
FIG. 36 is a sectional view taken on the line 36—36 of FIG. 33.
Figure 37:
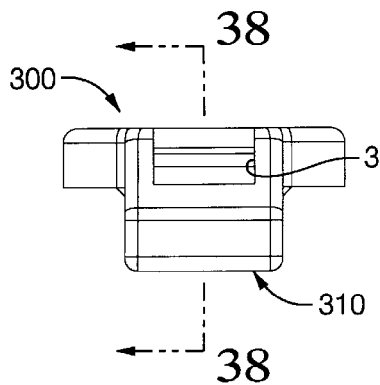
FIG. 37 is an end elevational view of the end of the cap part opposite to that shown in FIG. 35.
Figure 38:
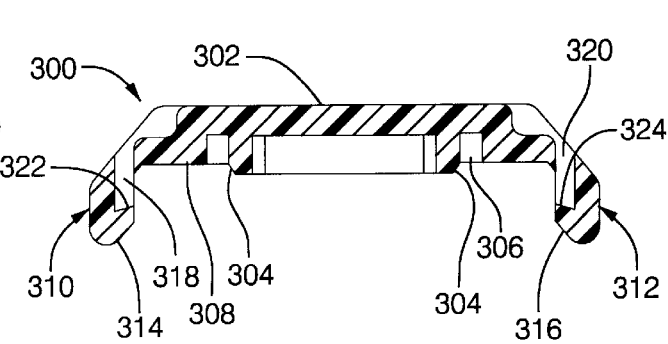
FIG. 38 is a sectional view taken on the line 38—38 of FIG. 35.
Figure 39:
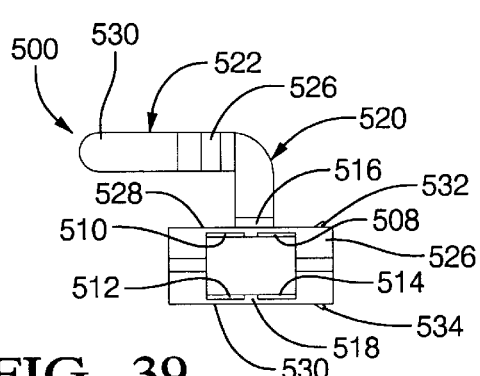
FIG. 39 is a top plan view of one of the two identical IDC terminals employed in the connector assembly of FIGS. 1 through 9.

The left and right-hand walls 208 and 210 of cover 200 are provided with protruding latch ears 270 and 272 respectively. During assembly of cover 200 onto connector 102 the flexible extreme outer tab portions of ears 160 and 162 of connector 102 first strike the chamfered edges 271 and 273 of latch ears 270 and 272 (FIG. 24). The ear tabs are then deflected downwardly until they move relatively past the associated strike portions of latches 270 and 272, and then the ear tabs spring out to the position of latching over the latch strike, as shown in FIGS. 1 and 11, as well as in FIGS. 2–8. As best seen in FIG. 24, the associated side walls 208 and 210 each have a cored-out notch 275 and 277 respectively that is straddled exteriorly of the cover by the associated strike of latches 270 and 272 and that defines with the associated notch the respective latch opening 279 above strike 272 (FIG. 29) and latch opening 281 above strike 270 (FIG. 31).

As best seen in FIGS. 9, 11, and 22–25, the exterior surface of top wall 202 of cover 200 is provided with an access opening 282 that is defined by an upwardly protruding and encircling rib 284. Rib 284 is flanked by a pair of cap-locking tangs 286 and 288 that protrude integrally from the upper edge of front wall 204 and rear wall 206 respectively. Each of the cap-locking tangs 286 and 288 is in turn respectively flanked by a pair of outwardly protruding and vertically extending latch guide ribs 290 and 292, and 294 and 296 respectively.

Cap 300 is shown in assembly as part of connector assembly 100 in FIGS. 1–8, in exploded assembly in FIG. 9, and is shown by itself in FIGS. 32–38. It will be seen that cap 300 is designed to have a snap-on, snap-lock engagement on cover 200 for sealing the opening 282 in cover 200. The outer surface of the top wall 302 of cap 300 is flat and has a contour overlappingly matching that of rib 284. The underside of wall 302 has a downwardly protruding generally rectangular rib 304 that is beveled on its leading edge to facilitate a snug fit into cover rib 284 as rib 284 in turn is received in a cap groove 306 defined in the underside of cap 300 radially between the inner rib 304 and peripheral margin portion 308 of cap 300.

The opposite longitudinal ends of cap 302 are provided with locking latch arms 310 and 312 dimensioned laterally to fit in assembly snugly between associated cover guide ribs 290, 292 and 294,296 respectively. Cap latch arms 310 and 312 slope generally downwardly in dependent relation from cap top wall 302 and are designed with a camming entrance surface 314 and 316 respectively (FIGS. 33 and 38) for flexing downwardly cover tangs 286 and 288 respectively when cap 300 is pushed downwardly into seated relation on cover 200, i.e., when moving from the position of FIG. 9 down to the assembled position of FIGS. 1–8. Each of the latch arms 310 and 312 is provided with a locking notch 318, 320 respectively (FIG. 38) with a reversely inclined locking surface 322,324 respectively on which respective cover tangs 286 and 288 seat after they snap into notches 318, 320 when cap 300 is fully seated on cover 200. The snapped in place, self-locking condition of cap 300 on cover 200 is shown in cross section in FIG. 3.

The trim resistor 400 is conventional and is a single-sided substrate having thick film resistance circuitry on one surface adapted to be laser trimmed to adjust the ohmic resistive value provided in circuit by this electrically conductive deposit in order to achieve the calibration required to compensate for variations that tend to occur during manufacture, assembly, and/or installation in circuit of the associated oxygen sensing system components and circuitry (not shown). Examples of construction of such substrates are disclosed in U.S. Pat. No. 5,209,122. Further technology in this regard is disclosed in U.S. Pat. No. 4,481,497 and in U.S. Pat. No. 4,850,277, all three of these patents being incorporated herein by reference.

The "E" pattern of resistive material on the substrate is indicated (on exaggerated scale as to thickness) at 402 and the ceramic substrate at 404 in FIGS. 47 and 49. Typically a target dot 406 is provided on substrate 404 to facilitate initiating aiming for impingement of a laser trimming beam. This laser beam then is directed to trace a path following the axis 408 (FIGS. 49 and 10) to burn open a selected cut portion of the "E" pattern of the resistance material 402. This modification of the "E" pattern thereby creates the desired adjustment of the resistivity of this portion of the circuit, i.e., "trimming" the sensing circuit resistance to permanently vary and thereby calibrate the voltage gain when amplifying the signal from the sensor and electrically coupling it to the control or ECU unit. Trim resistor substrate 400 is a commercially available item available in standard sizes and specifications. Indeed, connector assembly 100 is designed to snugly accommodate a given trim resistor substrate 400, rather than vice versa.

Figure 3:
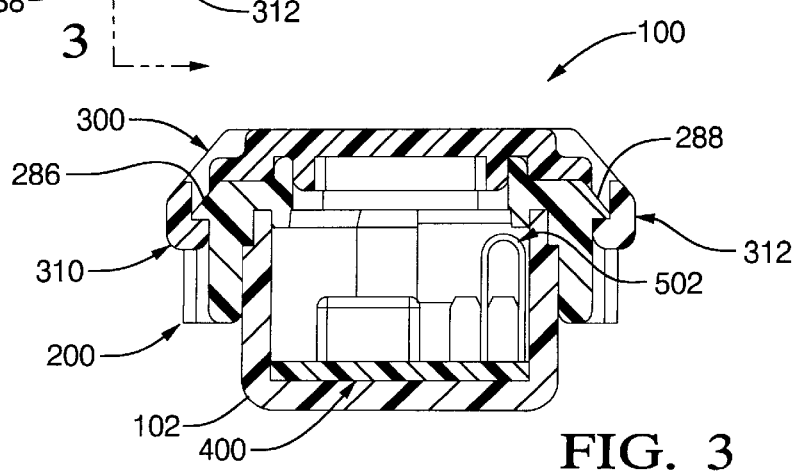
FIG. 3 is a sectional view taken on the line 3—3 of FIG. 2.
Figure 4:
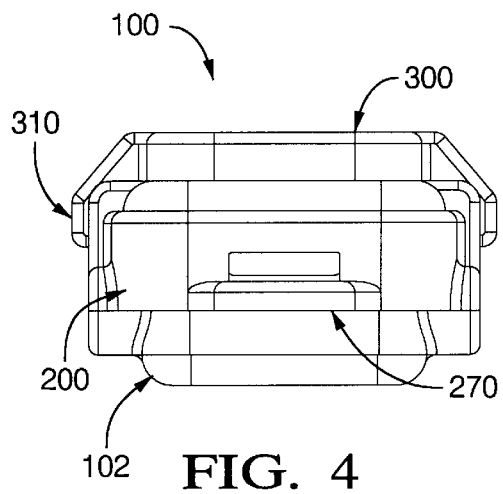
FIGS. 4 through 7 are side and end elevational views of the connector assembly of FIG. 1.
Figure 5:
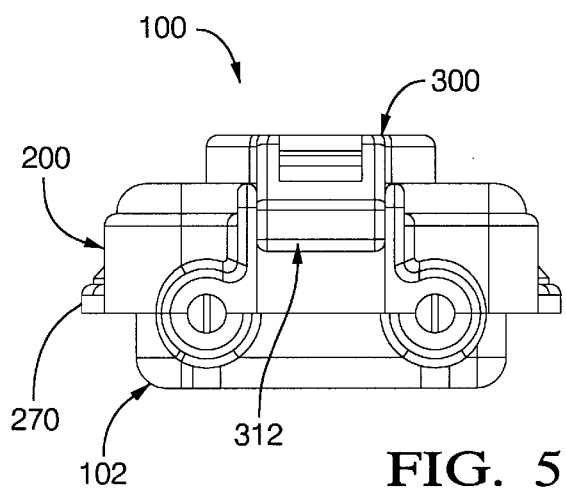
Figure 6:
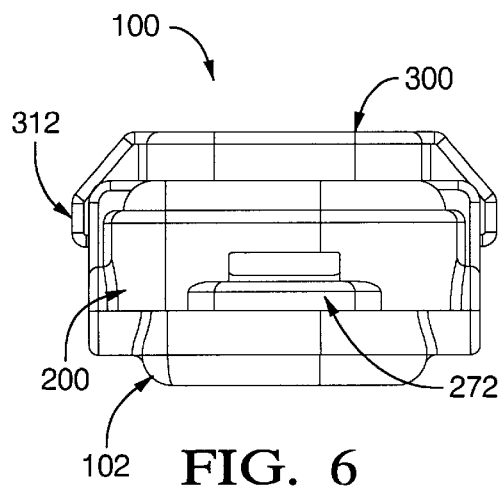
Figure 7:
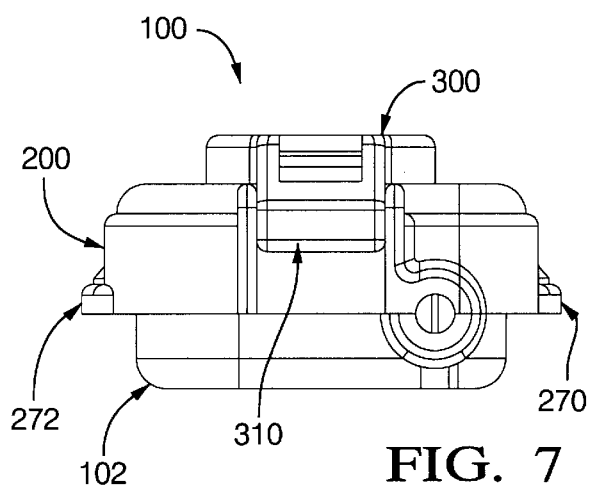
Figure 8:
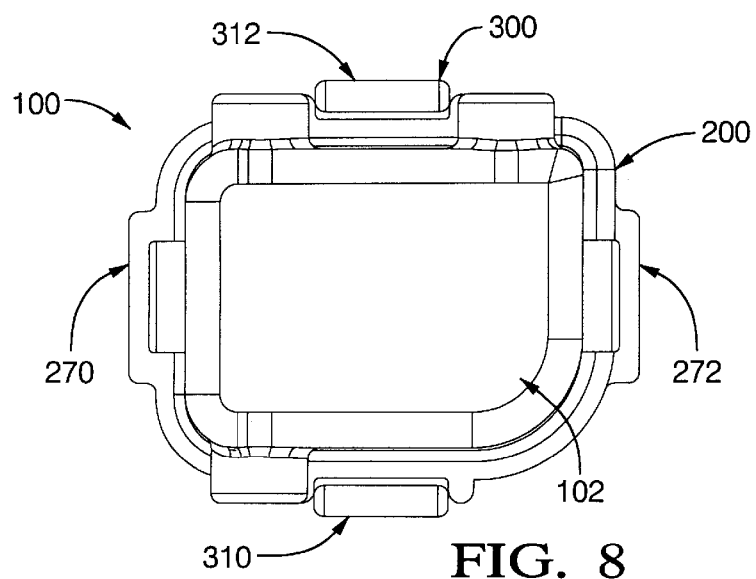
FIG. 8 is a bottom plan view of the connector assembly of FIG. 1.

Thus, as best seen in FIG. 10, substrate 404, which is of rectangular configuration in plan view, fits snugly lengthwise between the front and rear walls 122 and 124 of connector 102 and fits laterally snugly between the left-hand post array 164–170 and the right-hand post array 184–188, and as best seen in FIG. 3, seats flat on the upper surface of the bottom wall 120 of connector 102.

In insulation displacement connector (IDC) terminal 502 is identical to IDC terminal 500 and hence only terminal 500 will be described in detail in conjunction with its showing separately in FIGS. 39–46. Terminal 500 is formed of conductive sheet metal in a conventional progressive die stamping and bending press, the progressive die cut blanking 502 being shown in FIGS. 45 and 46. The blanking has a rectangular body 504 with a hexagonal center opening 506. The opposite longitudinal edges of opening 506 converge at 45° angles and are ground to provide insulation cutting knife edges 508, 510, 512 and 514 in accordance with conventional IDC terminal practice. Opening 506 is continued longitudinally by two blind end slits 516 and 518 to enable spreading or bending laterally of the body 504 as the conductive core of the associated insulated lead wire is splice-engaged in these slits in the terminal.

Figure 40:
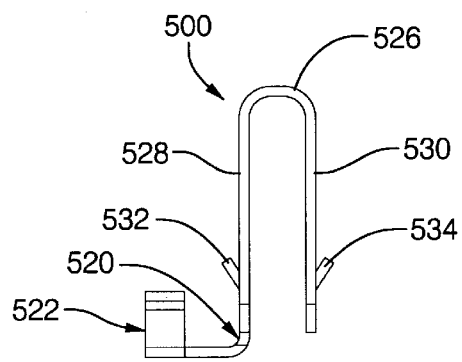
FIGS. 40 through 43 are end and side elevational views of the IDC terminal of FIG. 39.
Figure 41:
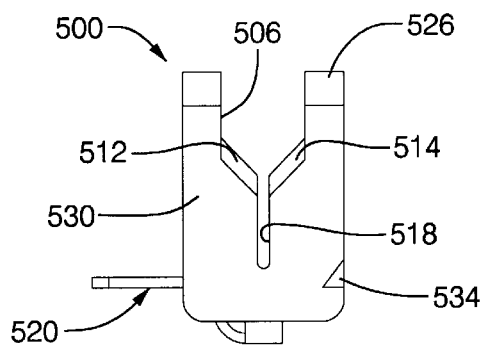
Figure 42:
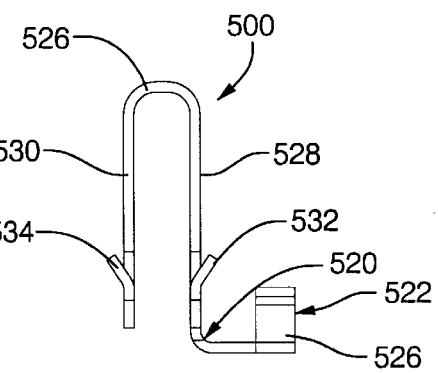
Figure 43:
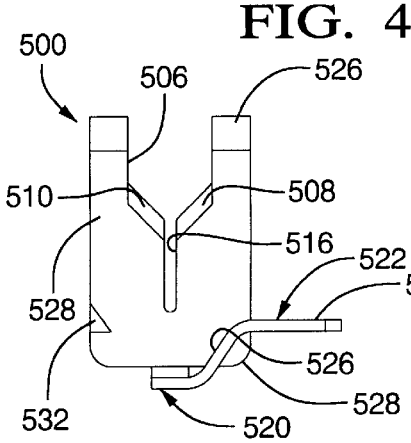
Figure 44:
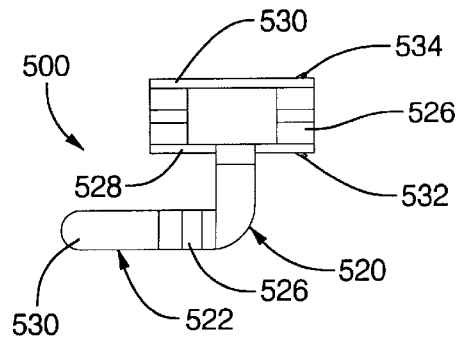
FIG. 44 is a bottom plan view of the terminal of FIGS. 39–43, and shown as a rotated plane projection of FIG. 41.
Figures 45, 46:
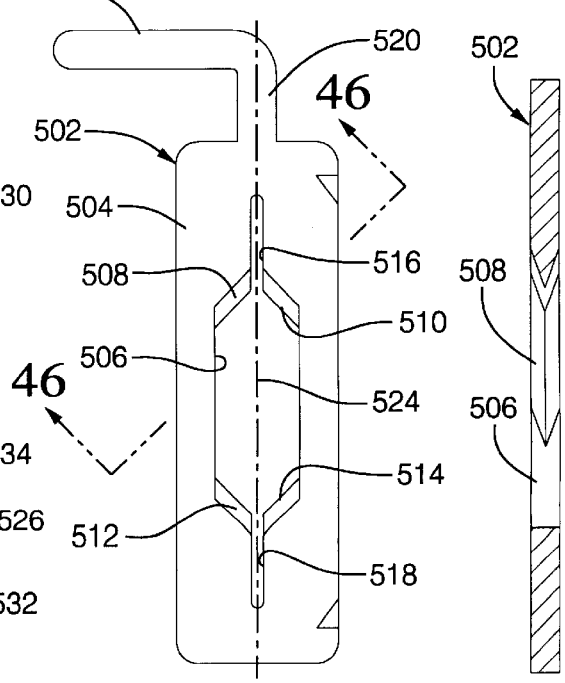
FIG. 45 is a plan view of the die stamped blank used in bend forming the IDC terminal of FIGS. 39–44 prior to bending to final form.
FIG. 46 is a sectional view taken on the line 46—46 of FIG. 45.

In accordance with one feature of the invention terminal blanking 502 is die-stamp formed with an extension spring leg 520 leading off from one longitudinal end of the blanking body 504 and configured to have an elongated finger 522 extending perpendicularly to the longitudinal axis 524 of body 504. Blanking 502 is then progressively bend-die-formed into the final configuration of terminal 500 shown in FIGS. 39–44. Thus, in its final form, IDC terminal 500 has, as viewed in side elevation in FIGS. 40 and 42, an inverted U-shape with a bite portion 526, that connects the two legs 528 and 530 of the "U", bisecting the opening 506. Terminal spring leg 520 is bent to extend outwardly perpendicularly to the plane of side 528 (FIGS. 40 and 42). The extension 522 of leg 520 is further formed into an open "S" configuration (FIG. 43) by forming an upwardly inclined portion 526 and then a reverse bend at 528 so that the final leg extension toe portion 530 lies in a plane perpendicular to the adjacent terminal side 528 and perpendicular to the terminal blanking longitudinal axis 524. A pair of retention barbs 532 and 534 are also struck out individually respectively from those edges of sides 528 and 530 remote from leg extension 522.

With the various individual components of connector assembly 100 constructed as described previously hereinabove, and as illustrated in the drawings as referenced hereinabove, the assembly procedure for connector assembly 100 is simple, straight-forward and very economical. First trim resistor substrate 400 is laid in place flat on the interior surface of bottom wall 120 of connector 102 as shown in FIGS. 3 and 10, substrate 400 being readily and accurately so positioned by the flanking connector side walls and terminal posts as described previously. Then IDC terminal 500 is installed as indicated in solid lines in FIG. 9 by aligning it above the left-hand terminal post array 164–170, terminal side leg 530 being aligned with the space or gap between terminal posts 164 and 166, side leg 528 being aligned with the gap between posts 166 and 168, and spring leg extension 522 aligned so as to protrude out through the gap between posts 168 and 170 so that the spring leg toe 530 overlies leg 410 of the trim resistor deposition 402.

Figure 16:
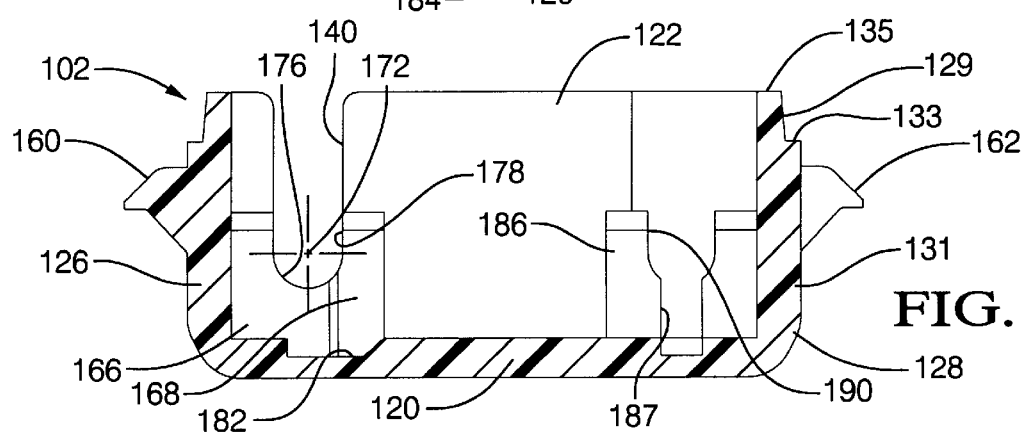
Figure 17:
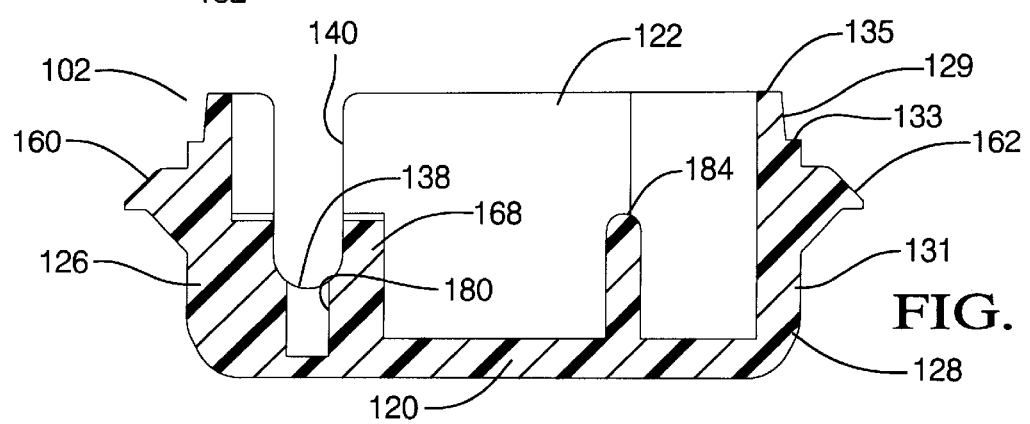

Note that when terminal 500 is fully pushed down as far as it will go on posts 164–170 (phantom line showing in FIG. 9) the terminal spring leg 520 will seat in trench 182 (FIGS. 12, 14 and 16). The inclined portion 526 of the leg extension 522 will bring the toe extremity 530 of the spring leg into interfering overlying relation with substrate leg 420 so as to press down on the same as the spring leg yieldably and resiliently deflects. Permanent mechanical and electrical connection is then (or subsequently) made between toe 530 of spring of leg extension 522 by soldering at 420 (FIG. 10). Note that barbs 532 and 534 slide down against the adjacent surfaces of posts 164 and 168 and produce an interference fit of terminal 500 therebetween. Due to the inclination and sharp edges of the barb, the terminal is locked in place once installed against retrograde pull-out in operation and use. Terminal 500 (in conjunction with terminal 502), with its barb anchoring on posts 164–168 and the overlying stressed nature of spring leg extension 530 on substrate 400, conveniently and reliably serves as an initial mounting and clamp for substrate 400 to hold the latter securely in place during further initial manufacturing, handling, assembly, and shipping, and during customer inventory handling, even if the soldering operation is deferred until the laser trimming operation is performed by the automotive manufacturing customer.

Terminal 502 is installed in connector 102 in a like manner to installation of terminal 500 but, of course, in association with the right-hand terminal posts 184, 186 and 188, as will be understood from the foregoing and with reference again to FIGS. 10 and 12 and also FIG. 3. The various component elements of IDC terminal 502 are given the same reference numeral raised by a prime suffix as those like elements of terminal 500 and their description not repeated. It will be seen that terminal 502 when pushed fully down has its side leg 528' positioned between terminal posts 186 and 188 with barb 532' digging into the adjacent side of post 186. The other side leg 530' of terminal 502 lies against the inner surface of rear wall 124 of connector 102, and accordingly barb 534' is shown digging into that wall. Barbs 532' and 534' thus likewise anchor terminal 502 against pull-out once it is pushed into fill seated position. Such anchoring barb retention is enhanced by the terminal being made as a stamping from suitable spring metal material and the terminal posts being injection-molded from thermoplastic material. Again, leg extension 522' extends out between posts 186 and 184 to overlie and spring clamp at its free end 530' onto the other leg 412 of the resistance deposition pattern 402. Either concurrently or subsequently leg toe 530' is likewise further mechanically and electrically connected to leg 412 by a soldered joint at 422 (FIG. 10). Connector 102, trim resistor substrate 400 and terminals 500 and 502 may then be shipped as a subassembly of the foregoing components to the automotive manufacturing customer, along with the remaining separate connector assembly components comprising cover 200 and cap 300, as a partially assembled assembly kit. The automotive manufacturer may, as a matter of original equipment manufacture or as a retrofit procedure, then perform final assembly of the IDC trim resistor connector assembly.

Final assembly procedure preferably includes the aforementioned soldering operation inasmuch as terminal spring legs 520, 520' are designed and dimensioned such that they are flexed and resiliently stressed when the terminals 500 and 502 are fully seated in assembled position and hence their leg extensions 522, 522' overlap and securely engage the associated conductive pads 410 and 412 of the resistance material 402 on substrate 400. The terminal legs 520, 520' thus act as spring clamps in initial assembly to hold substrate 400 firmly in place in connector 102, without soldering, for handling and shipping prior to final assembly by the automotive installer. During the final assembly and automotive installation of connector assembly 100 the installer will use connector assembly 100 to rapidly and reliably make an electrical and mechanical connection to at least one lead wire $LW_1$ electrically coupled between the exhaust sensor and the engine ECU wiring. For example, connector assembly 100 can be attached to existing customer sensor wiring already having an existing prior art output connector that has been preinstalled. Hence, the new connector assembly 100 is not required to be designed or tooled to match the connector family currently used for automotive sensor applications. This enables the customer to economically add resistance trim capability to their existing exhaust sensor system and wiring.

In the disclosed embodiments connector assembly 100 is thus designed by way of example to splice into the oxygen sensor circuitry using well accepted principles of automotive insulation displacement technology (IDC). Connector 102 splices into lead $LW_1$ that runs between one exhaust sensor element (either actual or reference) and one side (or end) of the associated main sensor bridge resistor. This main sensor resistor in turn is electrically coupled at its opposite ends respectively to the positive and negative input terminals of a differential amplifier whose output in turn is fed to the vehicle ECU system.

The other auxiliary lead $LW_2$ is provided for or with the connector assembly 100 and runs as a fifth lead from its IDC connection to trim resistor 402 (via terminal 502) to a standard junction box connection to the other side (or end) of the aforementioned main sensor bridge resistor. Trim resistor 402 is thereby electrically coupled in parallel circuit across the main sensor resistor to thereby function as the fine gain adjust trim resistor (varied once permanently for calibration) in the sensor system circuitry.

As shown in the example of FIG. 10, the existing lead wire $LW_1$ is thus spliced by connector 102 to a branch parallel gain fine adjust circuit containing the trim resistor 400 by first laying lead wire $LW_1$ loosely in its open associated connector lead pathway so that the same rests in the IDC notch provided in terminal 500. One end of another, auxiliary output lead $LW_2$ is likewise first loosely laid in its open associated connector lead pathway so as to rest in the IDC notch of terminal 502. Due to the sharp IDC cutting edges 508–514 and 508'–514', light finger pressure on these lead wires is sufficient to start the cutting action into the insulation of the wire and thereby temporarily lightly spring clamp and hold the insulated lead wires in place as so initially positioned.

Then cover 200 is placed in registering relation over connector 102, as indicated in the exploded perspective view of FIG. 9, and pressed downwardly until the locking tangs 160 and 162 have snapped into seated relation on the associated locking ears 270 and 272, as shown in FIG. 11 (as well as in FIGS. 1–8). During this downward assembly "press-on" of cover 200 on connector 102, presser/keeper 240 forces lead wire $LW_1$ fully down into the associated IDC terminal 500, causing terminal 500 to displace the lead wire cable as the wire is forced down into the narrow slot cut-outs 516, 518 in terminal 500. During this engagement the edges of the terminal slits 516 and 518 are actually forced to dig into the lead wire conductive (e.g., copper) core as thus bared by the displacement of the covering plastic insulation material by displacement action of the cutting edges 508–514 of the terminal, in accordance with conventional installation displacement technology. Lead wire $LW_2$ is likewise simultaneously fully seated and engaged in terminal 502 by presser/keeper 242 forcing lead $LW_2$ down into terminal 502.

Thus, the full seating of the lead wires $LW_1$ and $LW_2$ is assured merely by so installing cover 200 to assume its final assembled position of cover 200 on connector 102, and by the mechanical snap retention together of these parts provided by the locking tangs 160 and 162 cooperating with the locking ears 270 and 272. It also will be seen that the inner walls 122 and 124 of connector 102 and the terminal posts 161–170 and 184–188 form a four-sided flanking boundary to entrap substrate 400 from moving laterally once initially loosely drop assembled onto floor 120 in connector 102, as described previously. Then the foregoing subsequent assembly of lead wires $LW_1$ and $LW_2$ and cover 200 onto connector 102 reinforces the secure mechanical clamped retention by spring legs 520 and 520' of substrate 400 in connector 102, once the installation of cover 200 and lead wires $LW_1$ and $LW_2$ has been completed as described above.

With trim resistor substrate 400 thus properly and securely positioned in the subassembly of lead wires, IDC terminals, connector and cover, the foregoing soldering operation at 420 and 422 can be performed on a mass production basis by conventional automatic equipment wherein this subassembly serves as a workpiece in suitable fixturing equipment provided for performing this operation. Likewise, such automatic production assembly equipment can be set up to do the laser trimming operation as described previously to thereby calibrate the oxygen sensor circuitry of the automotive system. Typically this is done by a laser beam cutter starting at the target dot 406 and moving parallel to and along the longitudinal center axis indicated at 408 in FIG. 11. The laser beam removes a strip of metal from the conductive layer 402, thereby increasing the trim resistance presented by this conductive layer between the circuit connections at 420 and 422 to terminal spring legs 520 and 520'. If necessary this laser cut can move right into the main wide center leg 432 of the conductive layer 402 to produce a slot in the same to further increase the resistance presented in the foregoing parallel resistive circuit.

It will be seen that the two spring fingers 530 and 530' of terminals 500 and 502 as well as the associated narrow legs 410 and 412 of the E-shaped conductive layer 402 are positioned well clear of the cutting path 430 of the laser trimming instrument. It also will be noted that, prior to installation of cap 300 on cover 200, top opening 282 in cover 200 provides ample access for this soldering and laser trimming operation. When the calibration operation is completed the entire interior cavity of the connector subassembly formed by connector 102 and cover 200 is preferably filled, via cover opening 282, with a suitable silicon gel material, which is a very viscous material but not cured to hardness. Then cap 300 is snapped into place on cover rib 284 to lock the cap on cover 200 by the interengagement of locking tangs 286 and 288 and the associated latch ears 310 and 312 as described previously. Alternatively, the entire interior space of the cavity defined by cover 200 and connector 102 can be filled with a conventional potting compound and allowed to cure to a hardened state. Such use of a potting compound may, if desired, eliminate the need for cap 300, and the associated locking tangs 286 and 288 as well as guide ribs 290–296 on cover 200.

After installation in the automotive circuitry, and the foregoing laser trim calibration procedure has been completed and the unit sealed, either with gel and cap 300 or by potting compound, no further installation steps are required. Connector assembly 100 as designed is light weight and well adapted to hang suspended with the associated run of the sensor wiring harness, i.e., "hang in mid-air". It may also be covered by a woven fabric tubular sheave or sock of the conventional type employed as protective covering in wiring harness technology.

FIGS. 52–66 illustrate the construction of the components of a preferred but exemplary second embodiment connector assembly 600 wherein the output lead $LW_2$ may be preassembled and sold with the unit to the automotive installing customer. Connector assembly 600 thereby reduces potential errors and defects that otherwise might be introduced by deferring such auxiliary fifth lead assembly and installation to operations at the automotive plant or after-market facility. Connector assembly 600 utilizes some of the previously described components of connector assembly 100 and hence for brevity the same will be identified by identical reference numerals and their description not repeated. Also, those elements similar in function and mode of operation will be given a like reference numeral raised by a prime suffix for convenience in description and understanding.

Figure 52:
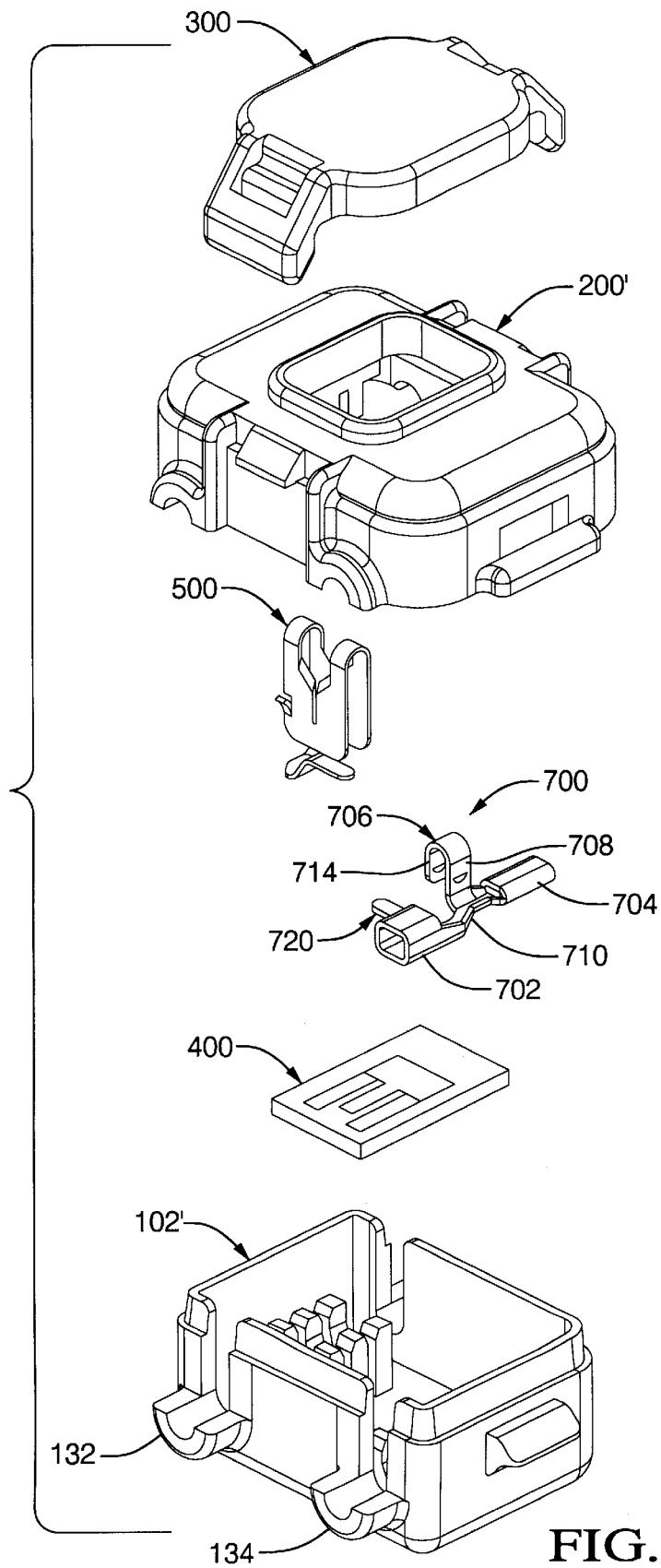
FIG. 52 is an exploded perspective view of a second embodiment of a trim resistor connector assembly of the invention.
Figure 59:
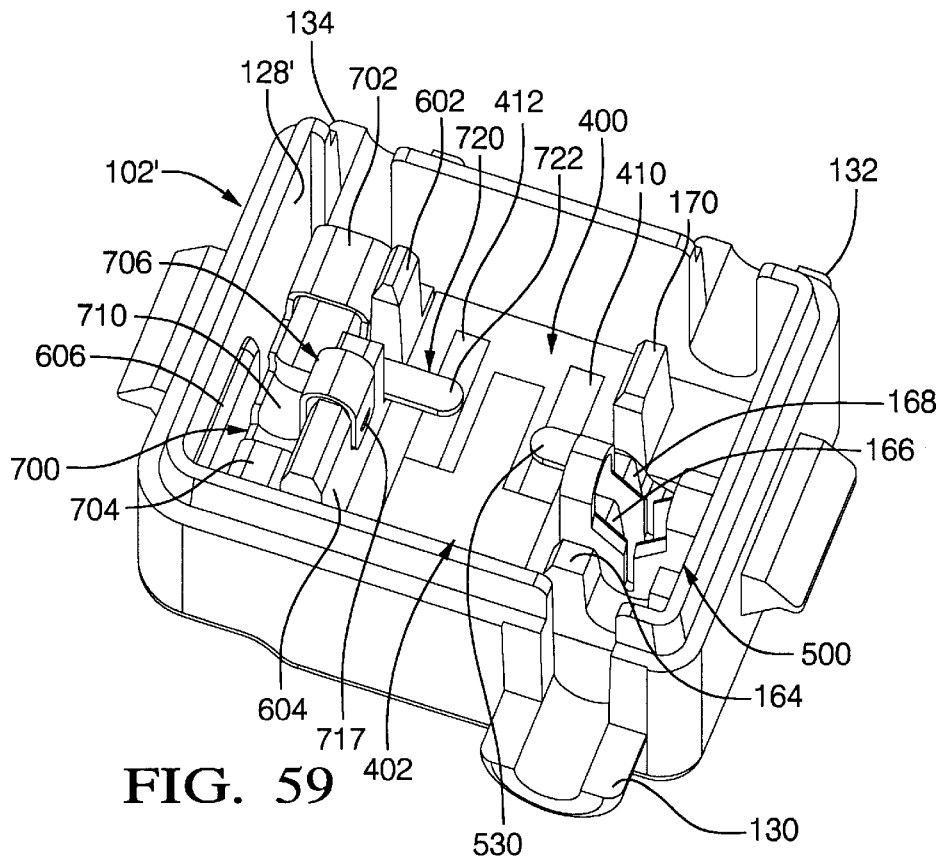
FIG. 59 is a perspective view of only the connector part of the connector assembly of FIG. 52, but with the first and second embodiments of IDC terminals installed therein.
Figure 60:
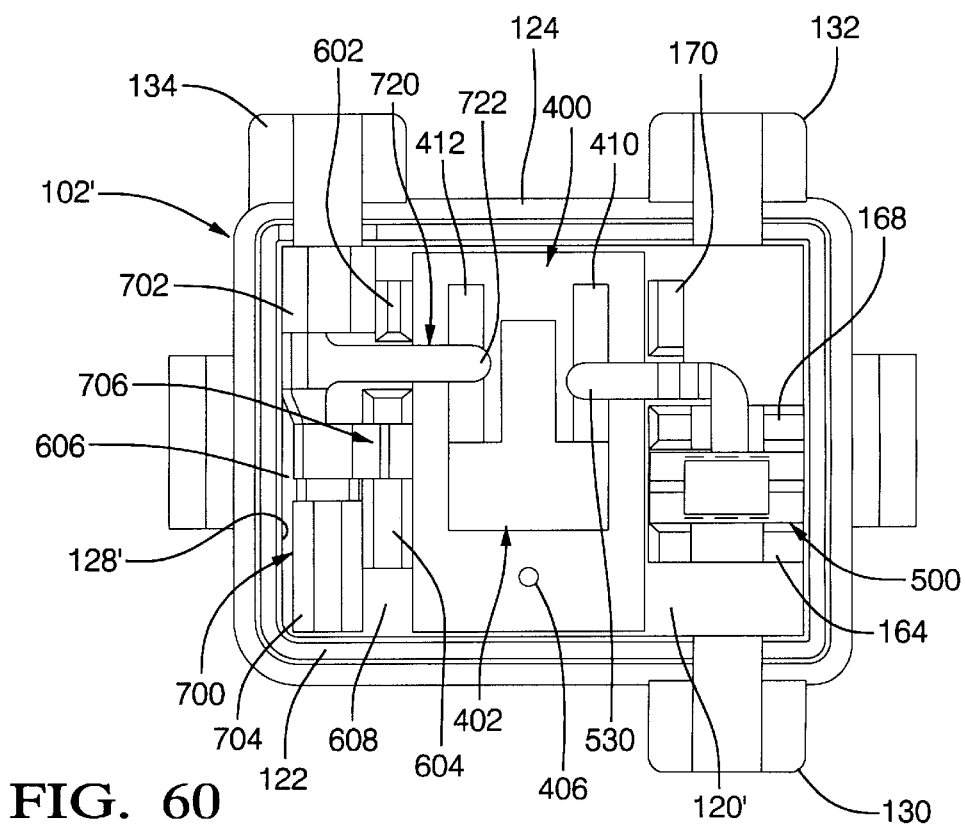
FIG. 60 is a top plan view of the connector part and terminal subassembly of FIG. 59.

In the second embodiment connector assembly 600, the connector end of output lead $LW_2$ (not shown in FIGS. 52–66) is provided with a special crimp-type terminal 700 shown in exploded perspective in FIG. 52, by itself in FIGS. 53–58 and in assembly with a modified connector 102' of connector assembly 500 in FIGS. 59 and 60. Connector 700 is generally of the crimp-on type made by progressive die-stamping and bending for clasping the end of an insulated lead wire having the metallic conductor core stripped of insulation for a short distance at its free end. Preferably the lead wire is inserted bare-wire-end first through the larger diameter tunnel 702 formed at one end of terminal 700 until the bared core free end is received within a narrower diameter tunnel 704 at the opposite axial end of terminal 700. Tunnel 702 is the mechanically crimped to squash onto and grip the insulated portion of the lead wire, and likewise the smaller tunnel 704 is mechanically crimped to squash onto and mechanically and electrically connect to the bare wire portion of the lead, in accordance with conventional crimp terminal technology.

However, in accordance with a further feature of the present invention, terminal 700 is specially configured as shown in FIGS. 52–58 for anchoring with a specially arranged cooperative terminal post array in connector 102' to provide the functions of terminal 502, namely, spring clamping, mechanical retention and electrical coupling to the trim resistor substrate 400. Thus the central portion of terminal 700 is provided with a laterally offset mounting strap 706 in the form of an inverted U shape having an arm 708 integrally connected at one end to a central connecting strip 710 of terminal 700 and positioned adjacent the tunnel 704. The upper end of strap arm 708 is connected to the bite portion 712 of strap 706 which in turn is integrally joined to a dependent arm 714 that terminates in a free end 716. A pair of anchoring barbs 717 and 718 are struck inwardly from strap arms 714 and 708 respectively to face one another and so as to incline upwardly and inwardly with their sharp ends facing upwardly within the interior of strap 706. Terminal 700 also has a laterally extending spring leg 720 integrally joined at its inner end to connector central portion 710 and terminating at a free end 722 designed to lap and be resiliently stressed in assembly onto trim resistor leg 410.

Connector 102', as well as cover 200', are modified from the corresponding connector 102 and cover 200 described previously only with respect to those elements of structure necessary to accommodate the special crimped terminal 700. The remainder of the structural components of parts 102' and 200' thus are the same as their corresponding parts 102 and 200 described previously. Referring to FIGS. 59–66, it will be seen that the IDC terminal post array 184–186 of connector 102 is replaced by a pair of terminal posts 602 and 604 constructed and arranged as shown to scale in FIGS. 59, 60, 64 and 65. Side wall 128' of connector 102' is also modified to provide an integral spacer block 606, and bottom wall 120' is provided with an elevated platform 608 (FIGS. 59, 60 and 64–66). Spacer block 606 and platform 608 accommodate the dimensional transition between the crimped cylinder 704 and the crimped cylinder 702 lengthwise of terminal 700, and the corresponding stepped configuration of connector mid-strip 710, to thereby provide snug seating of terminal 700 within the confines defined between wall 128' and the facing surfaces of terminal posts 602 and 604. These and further details of the assembly fit of terminal 700 in connector 102' are shown in FIGS. 59 and 60.

Figure 61:
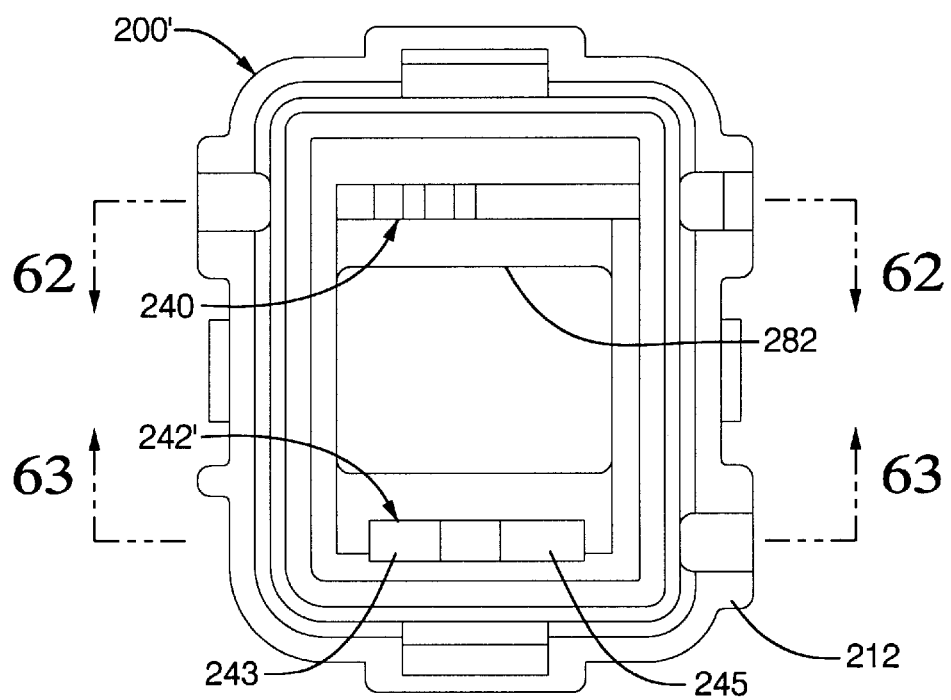
FIG. 61 is a bottom plan view of only the cover part of the second embodiment connector assembly of FIG. 52.
Figure 62:
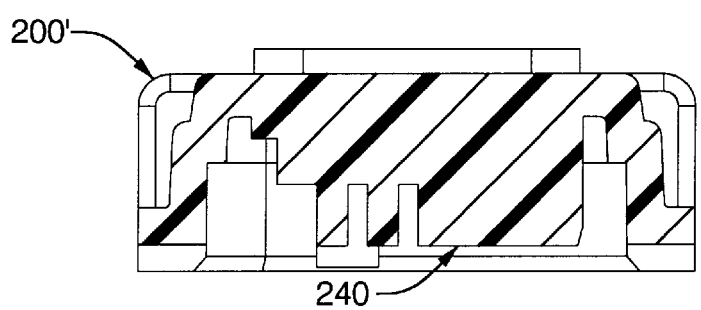
FIGS. 62 and 63 are sectional views taken respectively on the lines 62—62 and 63—63 of FIG. 61.

Note that large tunnel 702 is captured between wall 128' and terminal post 602. Spring arm 720 extends laterally out in the space between posts 602 and 604 and thus help anchor terminal 700 against movement by longitudinally directed forces exerted on the associated lead wire LW$_2$. Strap 706 is pushed down and clasps post 604 with bite 712 firmly seated on the upper edge of post 604 when fully inserted in assembled position. Small diameter tunnel 704 is firmly captured between spacer block 128' and the facing surface of post 604. The undersurface of tunnel 704 rests on platform 608 to maintain the longitudinal axis of terminal 700 parallel to and coincident with the lead axis defined by the ferrule 134 and the cooperative ferrule 212 of cover 200' (FIG. 61). Barbs 717 and 718 dig into the opposite vertical faces of post 604 to prevent removal motion of terminal 700 once fully seated in assembled condition shown in FIGS. 59 and 60.

Although the associated stripped end of lead wire LW$_2$ is not shown in FIGS. 52, 59 and 60, it is to be understood that the same is preferably pre-assembled to terminal 700 in a conventional marmer, and thus included on the wire before installation of wire LW$_2$ with terminal 700 thereon, without affecting the procedure of assembling terminal 700 in connector 102'. Alternatively, terminal 700 can be first installed in connector 102' as shown in FIGS. 59 and 60 before installing it on the lead wire. In this case, lead wire LW$_2$ is inserted telescopically bare-end-first into the connector-installed terminal 700, and then crimping of tunnels 702 and 704 on wire LW$_2$ is performed in-situ. In either case, the output lead wire LW$_2$ and associated crimp-on terminal 700 are installed in connector 102' by the manufacturer of connector assembly 600 so that this operation is completed prior to the connector assembly reaching the automotive installer.

Figure 63:
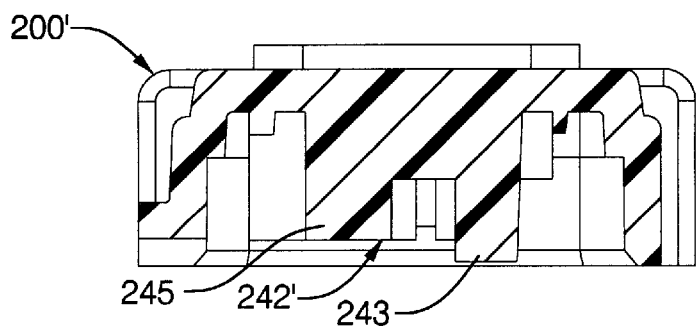
Figure 64:
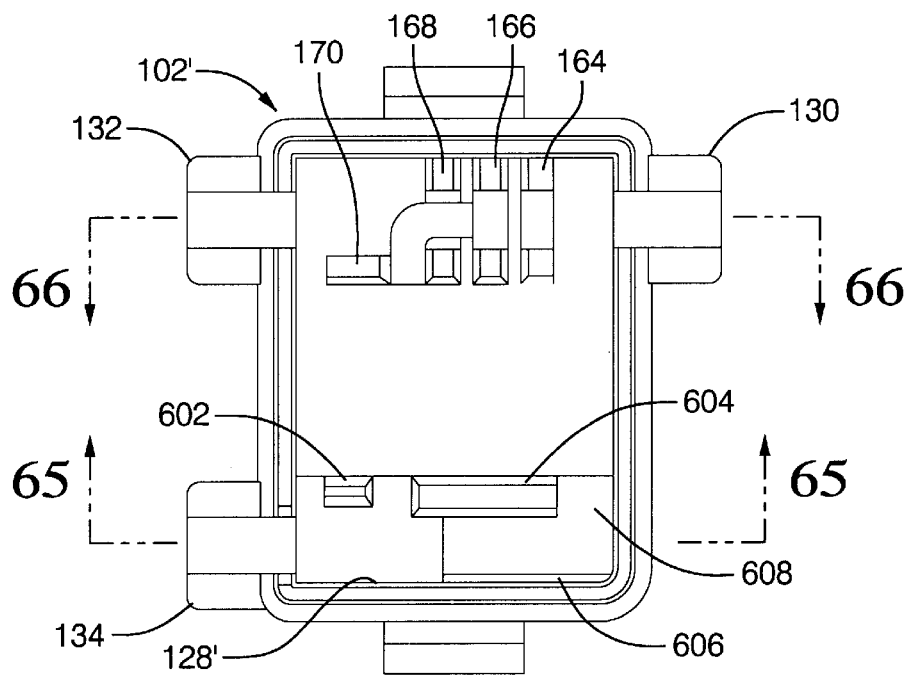
FIG. 64 is a top plan view of only the connector part of the second embodiment connector assembly of FIG. 52.
Figure 65:
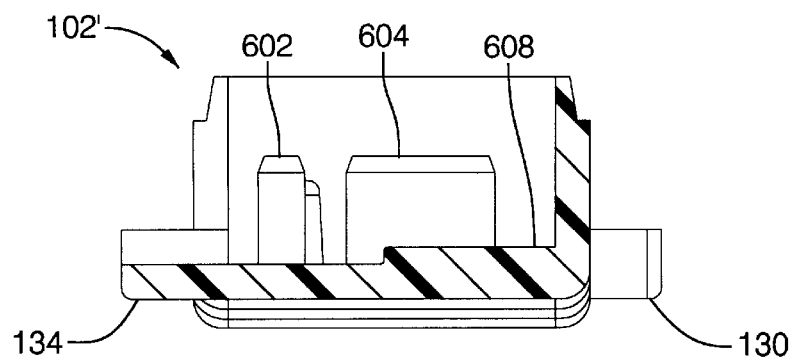
FIGS. 65 and 66 are sectional views taken respectively on the lines 65—65 and 66—66 of FIG. 64.
Figure 66:
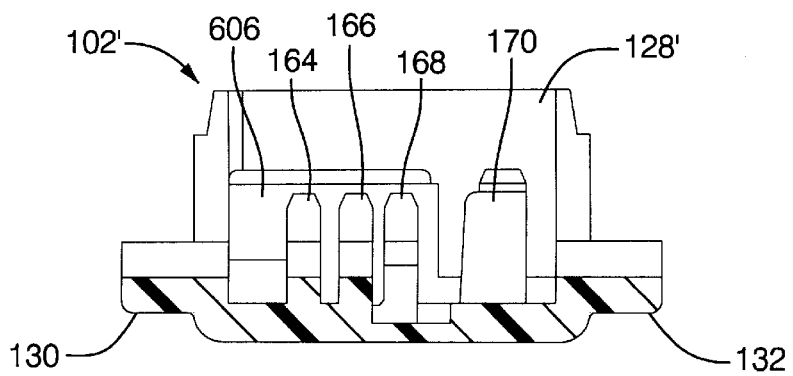

The only change required in cover 200' of assembly 600 versus that of the corresponding cover 200 is in the construction of the presser/keeper 242' that replaces the corresponding presser/keeper 242 of cover 200. As shown in FIGS. 61 and 63, presser/keeper 242' has a longer arm 243 and a shorter arm 245 that are designed to have their concave free end surfaces line up respectively with the bare core metal of the lead wire and with the insulated portion of the lead wire. The gap between the two arms 243 and 245 lines up with the strap 706 of terminal 700 in final assembly of cover 200' on connector 102'.

In the preferred assembly procedure with the second embodiment connector assembly 600, terminal 700 is pre-assembled to the stripped end of the output lead wire LW$_2$ and this lead along with the lead LW$_1$ partially inserted in temporarily assembled condition in the manner described previously in conjunction with initial assembly of leads LW$_2$ and LW$_1$ in connector 102. Assembling cover 200' onto this subassembly of connector 102' with terminals 500 fully installed, but terminal 700 partially installed, will cause the presser/keeper 240 to push the associated lead LW$_1$ into final position and thereby fully coupled to terminal 500 both mechanically and electrically. This press-on of cover 200' also will cause presser/keeper 242' to likewise push the subassembly of terminal 700 and the crimped-in end of the output lead LW$_2$ downwardly into fully seated position nested between terminal posts 602 and 604 and side wall 128' and spacer block 606.

Again, the access opening 282 in cover 200' enables making the soldered connection of the free end 722 of spring arm 720 onto trim resistor arm 412, and likewise the free end 530 of terminal 500 onto leg 410. Thus, connector assembly 600 is shipped from its manufacturer with the output lead LW$_2$ and associated crimp terminal 700 preinstalled in connector 102', whereas the first embodiment connector assembly 100 is shipped with terminals 500 and 502 preinstalled but not with output lead wire LW$_2$.

It will be apparent from the foregoing description and detailed drawings (drawn to engineering scale and as referenced in the description} to those of ordinary skill in the art that the improved trim resistor connector assemblies 100 and 600 of the invention amply fulfill one or more of the aforestated objects and provide many features and advantages over the prior art. Connector assemblies 100 and 600 can be attached to existing customer sensor wiring using existing output connectors. Hence they do not require that a new connector be designed and tooled to match the connector family currently used for sensor application. The automotive installation customer thus does not need a new connector to be designed and tooled in order to add resistance trim capability to their exhaust sensor system. The connector assemblies also can be made, installed and used at less expense than the current system using mold embedded components.

The improved connector assemblies 100 and 600 with their protectively packaged but accessible trim resistors make it possible to readily alter the automotive electrical circuitry to thereby increase electrical resistance for fine tuning, gain or other circuitry parameters of a completed wire assembly, and making them a particularly useful adjunct to the oxygen sensor circuitry of the automotive electronics systems. The invention thus provides a less expensive means of calibrating the oxygen sensor either after or prior to installing the same in the vehicle. Exhaust system sensor performance is thus improved by having the calibration trim capability easily added.

The universal design of the connector assemblies 100 and 600 allows the trim resistor connection to be added to new as well as to existing sensor wiring assemblies and in a convenient, reliable and economical manner. Having the trim resistor in a separate IDC connector box provides versatility, enabling use of the various existing types of terminals and styles being used by a variety of potential customers. The invention thus enables adjustable resistance capability to be provided for any oxygen sensor connection system without thereby changing the existing sensor output connector.

Each connector assembly 100 and 600 is readily adaptable to automated fixturing equipment suitably adapted for performing both laser trimming and soldering operations in conjunction with automated circuitry calibration instrumentation in a typical automated mass production set up as typically provided by the automotive manufacturer and installer. Trim resistor 400 is well protected in a strong housing and sealed against the elements to insure reliability in use and operation, and to provide a long service life despite use in adverse environments such as in the vehicle engine compartment. The plastic components, namely connector 102, 102', cover 200, 200' and cap 300 are well adapted to mass production in injection molding machines, and the metal terminals 500, 502 and 700 are well adapted for manufacture by conventional terminal die-forming tooling in conventional progressive die-stamping and bending or forming machines.

What is claimed is:

1. Trim resistor connector assembly comprising in combination a connector of generally open top cup shape having a bottom wall and a peripheral side wall with side wall slots to accommodate passage therethrough of a first lead wire of sensor circuitry, a first array of terminal posts on said bottom wall arranged within the interior of the connector housing, a first stamped metal terminal push-on assembly mounted on said terminal posts and adapted to cradle the first lead wire therebetween, a trim resistor, having a substrate mounted on the bottom wall of said connector and having a resistive conductive composition material arranged in a pattern thereon for laser trimming and calibration of circuitry to be associated with said trim resistor connector assembly, said first terminal having a first spring arm adapted to lap a first portion of said trim resistor material and to clamp said resistor substrate in place on said connector bottom wall in assembly, a cover adapted to be mounted onto said connector to cover the same, said cover having an access opening in registry with the trim resistor substrate as positioned interiorly of said connector to enable laser trimming and circuit calibration by access to said trim resistor substrate through said cover opening, and second lead wire electrical coupling means mounted in said connector and adapted for electrically connecting a second lead wire to a second portion of said trim resistor material on said substrate whereby said trim resistor is adapted to provide a conductive laser-trimmable resistance path between the first and second lead wires in assembly and operation of the connector assembly in an electrical system.

2. The combination set forth in claim 1 wherein said first terminal is an IDC terminal having struck-out barbs cooperative with said first array terminal posts to anchor said first terminal once fully inserted downwardly onto said first array terminal posts such that the associated spring arm of said first terminal mechanically clamps said trim resistor substrate in position on said connector bottom wall to at least initially hold the same in place for subsequent processing including the laser trimming operation.

3. The combination set forth in claim 1 wherein said first terminal is an IDC terminal and said connector is provided with first and second laterally spaced parallel lead wire pathways, said first pathway being a through-pathway adapted for placing the first lead wire therethrough and splicing into the same by IDC coupling to said first terminal, said second pathway being adapted for receipt of an output second lead having a terminal end to be positioned within the interior of said connector and coupled to said second electrical coupling means.

4. The combination set forth in claim 3 wherein said second electrical coupling means comprises a stamped metal IDC terminal mounted by a second array of terminal posts within said connector and having a second spring arm lapping said trim resistor substrate.

5. The combination set forth in claim 3 wherein said output second lead wire has a crimped terminal fastened thereto and has a bared end core wire terminating in said crimped terminal, said crimped terminal having a mounting strap cooperative with a second terminal post array in said housing and having mounting barbs to hold said crimped terminal in place when fully installed on said second terminal post array.

6. The combination set forth in claim 1 wherein said lead wire pathways are provided with cooperative half-ferrules on both said connector and said cover adapted to mate with one another in assembly to thereby provide complete ferrules adapted to reinforce the lead wires against flexing stress where they enter and/or exit from the assembled cover and connector.

7. The combination set forth in claim 1 wherein said assembly includes a cap for covering said cover opening.

8. The combination set forth in claim 7 wherein said cover and said connector have cooperative locking tangs and locking ears to provide snap-on retention of said cover on said connector during push-down assembly of said cover on said connector, said cap and said cover likewise having cooperative locking tangs and latching ears adapted to provide snap-together locking of said cap on said cover when said cap is pushed down and assembled on said cover opening.

9. The combination set forth in claim 4 wherein said first and second IDC terminals each comprise an electrically conductive sheet metal unitary member die-formed from a blanking having an elongated rectangular body portion and a co-planar resilient spring leg portion having a first portion extending initially longitudinally from one longitudinal end of said body portion and a second portion curved through generally 90° to form a toe of said spring leg, said blanking being formed into an inverted U-shape having parallel first and second side walls joined at one longitudinal end by a bite portion, said spring leg being bent perpendicularly at a junction thereof with said first side wall so as to protrude laterally outwardly of said terminal from said first side wall.

10. The combination set forth in claim 9 wherein said blanking is formed with a central opening having parallel side edges and mutually opposed V-shaped end edges formed into insulation displacement edges and converging in a direction away from said opening, each of said V-shaped edges converging at their vertex on the opening to a blind-end slot extending longitudinally in said body portion and terminating short of the opposite longitudinal ends thereof.

11. The combination set forth in claim 4 wherein said pattern on said trim resistor substrate is in the general form of a capital "E" as defined by three parallel branch legs comprising a center leg flanked by first and second legs and each joined at one end to a main leg oriented perpendicularly to said branch legs, said spring legs of said first and second terminals overlappingly respectively contacting only said first and second branch legs, said center leg providing the material for forming a laser-formed resistance trimming slot therein running parallel to said legs.

12. The combination set forth in claim 9 wherein each said terminal post array is constructed and arranged to define parallel wall surfaces spaced laterally apart to define first and second planar slots extending transversely of said pathway and respectively receiving said first and second sides of said terminal body with said IDC V-shaped edges centered laterally of said slots, and wherein said barbs are oriented to dig into mutually adjacent ones of said parallel wall surfaces.

13. The combination set forth in claim 5 wherein said second terminal post array has a pair of posts spaced from one another along the associated lead wire pathway axis to define a gap therebetween, said spring leg of said crimped terminal extending through said gap perpendicular to said pathway axis and thereby utilizing said pair of posts for anchoring said terminal against movement in response to lead wire push and pull forces exerted parallel to the associated pathway axis.

14. The combination set forth in claim 1 wherein said cover has a push-in/keeper projection oriented to closely overlie the connector interior pathway for the first lead wire in assembly of said cover on said connector such that press-on assembly of said cover on said connector is adapted to cause said projection to force the first lead wire into fully seated position on said first terminal and said first terminal on said first terminal array.

15. The combination set forth in claim 2 wherein said first terminal is an IDC terminal and said connector is provided with first and second laterally spaced parallel lead wire pathways, said first pathway being a through-pathway adapted for placing the first lead wire therethrough and splicing into the same by IDC coupling to said first terminal, said second pathway being adapted for receipt of an output second lead having a terminal end to be positioned within the interior of said connector and coupled to said second electrical coupling means.

16. The combination set forth in claim 15 wherein said second electrical coupling means comprises a stamped metal IDC terminal mounted by a second array of terminal posts within said connector and having a second spring arm lapping said trim resistor substrate.

17. The combination set forth in claim 15 wherein said output second lead wire has a crimped terminal fastened thereto and has a bared end core wire terminating in said crimped terminal, said crimped terminal having amounting strap cooperative with a second terminal post array in said housing and having mounting barbs to hold said crimped terminal in place when fully installed on said second terminal post array.

18. The combination set forth in claim 17 wherein said lead wire pathways are provided with cooperative half-ferrules on both said connector and said cover adapted to mate with one another in assembly to thereby provide complete ferrules adapted to reinforce the lead wires against flexing stress where they enter and/or exit from the assembled cover and connector.

19. The combination set forth in claim 18 wherein said assembly includes a cap for covering said cover opening.

20. The combination set forth in claim 19 wherein said cover and said connector have cooperative locking tangs and locking ears to provide snap-on retention of said cover on said connector during push-down assembly of said cover on said connector, said cap and said cover likewise having cooperative locking tangs and latching ears adapted to provide snap-together locking of said cap on said cover when said cap is pushed down and assembled on said cover opening.

21. The combination set forth in claim 20 wherein said first IDC terminal comprises an electrically conductive sheet metal unitary member die-formed from a blanking having an elongated rectangular body portion and a co-planar resilient spring leg portion having a first portion extending initially longitudinally from one longitudinal end of said body portion and a second portion curved through generally 90° to form a toe of said spring leg, said blanking being formed into an inverted U-shape having parallel first and second side walls joined at one longitudinal end by a bite portion, said spring leg being bent perpendicularly at a junction thereof with said first side wall so as to protrude laterally outwardly of said terminal from said first side wall.

22. The combination set forth in claim 21 wherein said blanking is formed with a central opening having parallel side edges and mutually opposed V-shaped end edges formed into insulation displacement edges and converging in a direction away from said opening, each of said V-shaped edges converging at their vertex on the opening to a blind-end slot extending longitudinally in said body portion and terminating short of the opposite longitudinal ends thereof.

23. The combination set forth in claim 22 wherein said pattern on said trim resistor substrate is in the general form of a capital "E" as defined by three parallel branch legs comprising a center leg flanked by first and second legs and each joined at one end to a main leg oriented perpendicularly to said branch legs, said spring legs of said first and second terminals overlappingly respectively contacting only said first and second branch legs, said center leg providing the material for forming a laser-formed resistance trimming slot therein running parallel to said legs.

24. The combination set forth in claim 23 wherein said first terminal post array is constructed and arranged to define parallel wall surfaces spaced laterally apart to define first and second planar slots extending transversely of said pathway and respectively receiving said first and second sides of said terminal body with said IDC V-shaped edges centered laterally of said slots, and wherein said barbs are oriented to dig into mutually adjacent ones of said parallel wall surfaces.

25. The combination set forth in claim 24 wherein said second terminal post array has a pair of posts spaced from one another along the associated lead wire pathway axis to define a gap therebetween, said spring leg of said crimped terminal extending through said gap perpendicular to said pathway axis and thereby utilizing said pair of posts for anchoring said terminal against movement in response to lead wire push and pull forces exerted parallel to the associated pathway axis.

26. The combination set forth in claim 25 wherein said cover has a push-in/keeper projection oriented to closely overlie the connector interior pathway for the first lead wire in assembly of said cover on said connector such that press-on assembly of said cover on said connector is adapted to cause said projection to force the first lead wire into fully seated position on said first terminal and said first terminal on said first terminal array.

\* \* \* \* \*